(12) United States Patent
Wang

(10) Patent No.: US 11,897,161 B1
(45) Date of Patent: Feb. 13, 2024

(54) SHAPER CUTTER HEADS AND ROUTER BITS WITH INDEXING FEATURE

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 18/489,105

(22) Filed: Oct. 18, 2023

Related U.S. Application Data

(63) Continuation-in-part of application No. 17/308,744, filed on May 5, 2021, now Pat. No. 11,839,922.

(51) Int. Cl.
| | |
|---|---|
| *B23C 3/12* | (2006.01) |
| *B27G 5/04* | (2006.01) |
| *B27G 13/12* | (2006.01) |
| *B23C 5/06* | (2006.01) |

(52) U.S. Cl.
CPC ............ *B27G 13/12* (2013.01); *B23C 3/12* (2013.01); *B23C 5/06* (2013.01); *B23C 3/126* (2013.01); *B27G 5/04* (2013.01)

(58) Field of Classification Search
CPC ..... B23C 5/1054; B23C 5/109; B23C 5/1081; B23C 5/26; B23C 5/06; B23C 3/12; B23C 3/122; B23C 3/126; B23C 3/128; B23C 2200/16; B23C 2200/201; B23C 2200/20; B27G 13/12; B27G 13/14; B27G 13/005
See application file for complete search history.

(56) References Cited

U.S. PATENT DOCUMENTS

| | | | | |
|---|---|---|---|---|
| 1,172,776 | A * | 2/1916 | Engler | B27G 13/10 144/231 |
| 2,374,552 | A * | 4/1945 | Marini | B23B 51/107 408/201 |
| 3,381,728 | A * | 5/1968 | Goldstein | B27F 5/12 144/228 |
| 3,701,188 | A * | 10/1972 | Wall | B23B 51/08 144/240 |
| 5,433,563 | A * | 7/1995 | Velepec | B27G 13/14 409/234 |
| 5,468,100 | A * | 11/1995 | Naim | B27G 13/007 409/234 |
| 5,499,667 | A * | 3/1996 | Nakanishi | B27G 13/14 144/353 |
| 5,593,253 | A * | 1/1997 | Pozzo | B23C 5/109 407/54 |
| 5,615,718 | A * | 4/1997 | Venditto | B23Q 35/104 144/135.2 |
| 5,647,700 | A * | 7/1997 | Velepec | B23C 3/126 407/42 |

(Continued)

*Primary Examiner* — Nicole N Ramos
(74) *Attorney, Agent, or Firm* — Wolter Van Dyke Davis, PLLC; Robert L. Wolter

(57) ABSTRACT

An apparatus (1300), including: a shaper cutter head (1308) having: a body (1312); a bore (1314) through the body; and a cutter 1310) secured to the body. Along a longitudinal axis (1306), the cutter has: a miter profile, a groove profile and a tongue profile for cutting a miter. The body has a portion (1352) comprising a recess (1320) disposed between the miter profile of the cutter and an end of the body. The recess defines a flat indexing surface (1326) protruding radially outwards from a portion of the body. When the shaper cutter head is rotated about the longitudinal axis, the body defines a body sweep (1360). The flat indexing surface is recessed from the body sweep.

15 Claims, 31 Drawing Sheets

(56) References Cited

U.S. PATENT DOCUMENTS

| | | | | |
|---|---|---|---|---|
| 5,662,435 A * | 9/1997 | Sherman | B27G 13/12 | 407/56 |
| 6,688,351 B2 * | 2/2004 | Stager | B27G 13/007 | 144/237 |
| 7,036,539 B2 * | 5/2006 | Sherman | B27G 3/00 | 407/56 |
| 7,131,473 B1 * | 11/2006 | Brewer | B23C 5/26 | 409/203 |
| 7,150,589 B2 * | 12/2006 | Nordlin | B23B 51/101 | 144/237 |
| 7,171,760 B1 * | 2/2007 | Lemon | B23D 59/002 | 33/833 |
| 8,235,080 B2 * | 8/2012 | Lee | B27G 13/007 | 144/240 |
| 9,623,491 B2 * | 4/2017 | Dieckilman | B23C 3/126 | |
| 9,682,492 B1 * | 6/2017 | Schaffter | B23Q 17/2233 | |
| 2003/0072624 A1 * | 4/2003 | Dollar | B23C 5/1081 | 407/30 |
| 2004/0126197 A1 * | 7/2004 | Allemann | B27G 13/002 | 409/130 |
| 2007/0217873 A1 * | 9/2007 | Martin | B23C 5/109 | 407/113 |
| 2008/0170917 A1 * | 7/2008 | Hilker | B23C 5/1054 | 407/54 |
| 2008/0240869 A1 * | 10/2008 | Hall | B23C 5/1081 | 407/32 |
| 2010/0122752 A1 * | 5/2010 | Lee | B27G 13/12 | 407/57 |
| 2011/0097163 A1 * | 4/2011 | Swiatowy | B23C 3/007 | 407/42 |
| 2014/0290798 A1 * | 10/2014 | Hilker | B27G 13/005 | 144/219 |
| 2019/0321999 A1 * | 10/2019 | Wang | B27G 13/14 | |

* cited by examiner

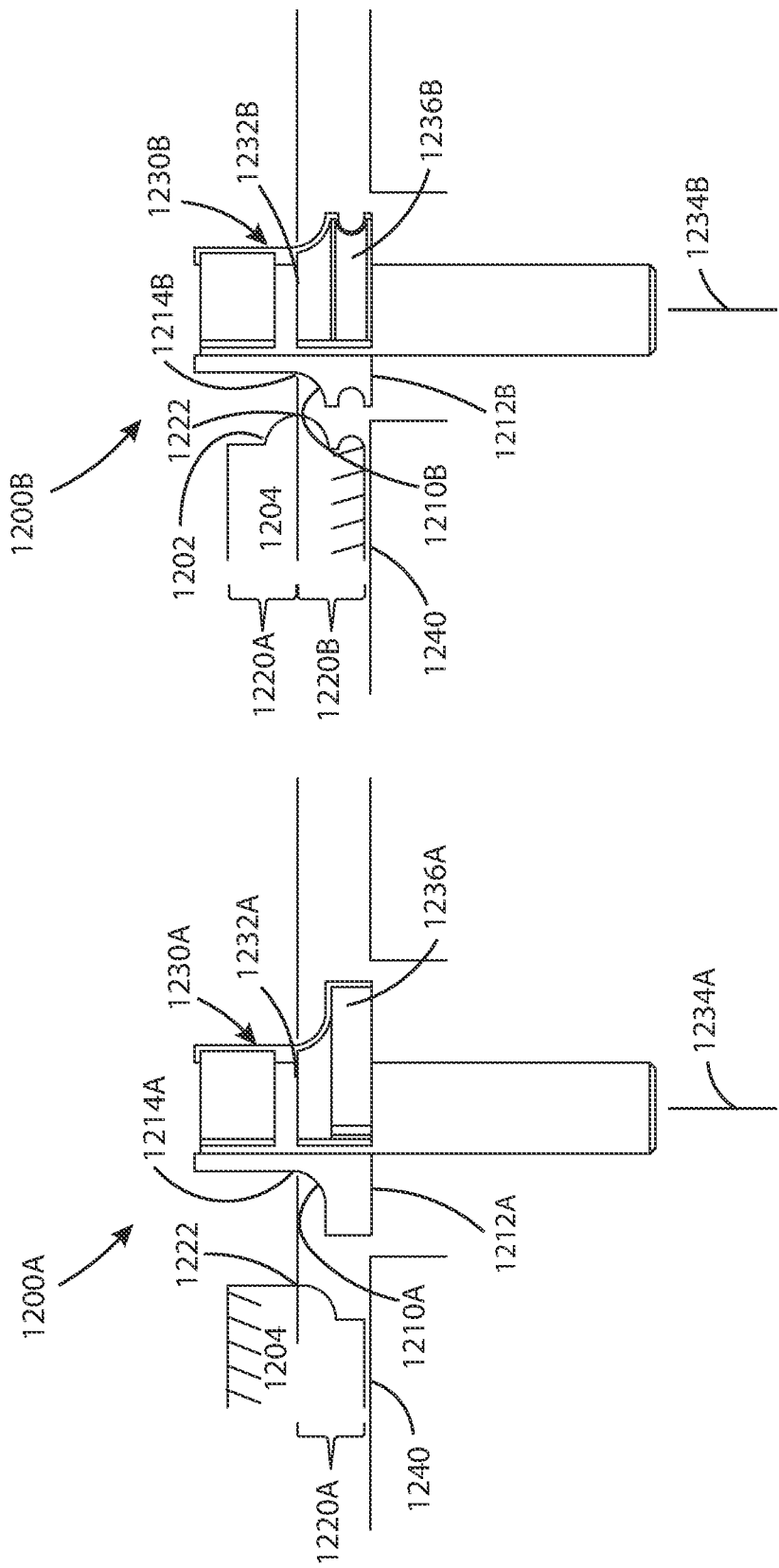

SHAPER CUTTER HEADS AND ROUTER BITS WITH INDEXING FEATURE

FIELD OF THE INVENTION

The invention relates to an indexing feature built into shaper cutter heads and router bits to aid in selecting a cutting height relative to a work surface.

BACKGROUND OF THE INVENTION

Shaper cutter heads and router bits for shaping workpieces are typically installed in collets of machines that will spin the shaper cutter heads and bits so the shaper cutter heads and bits can shape a workpiece. Router bits usually includes a shank that fits into a collet of the machine. Once the shank is inserted into the collet, the body of the machine can be vertically adjusted. Adjusting the vertical position of the body of the machine adjusts a height of a cutter of the bit relative to a surface on which the workpiece rests. Hence, adjusting the body of the machine adjusts a position of the cutter relative to the edge of the workpiece. Adjusting the position of the cutter enables the operator to properly align the cutter with the edge of the workpiece. Shaper cutter heads are assembled onto a spindle and the spindle is inserted into a collet of the machine. Vertical adjustment is achieved in a manner similar to that of router bits. Certain factors, including varying thicknesses of the workpieces, make proper alignment difficult. This is especially true for shaper cutter heads and router bits having cutter profiles that are free of features that can be used as reference points to aid in the alignment of the cutter. Accordingly, there is room in the art for improvement.

BRIEF DESCRIPTION OF THE DRAWINGS

The invention is explained in the following description in view of the drawings:

FIG. 12A is a side view of an example embodiment of a first cooperating router bit with an example embodiment of the indexing feature; and FIG. 12B is a side view of an example embodiment of a second cooperating router bit with an example embodiment of the indexing feature.

DETAILED DESCRIPTION OF THE INVENTION

Figure 1:
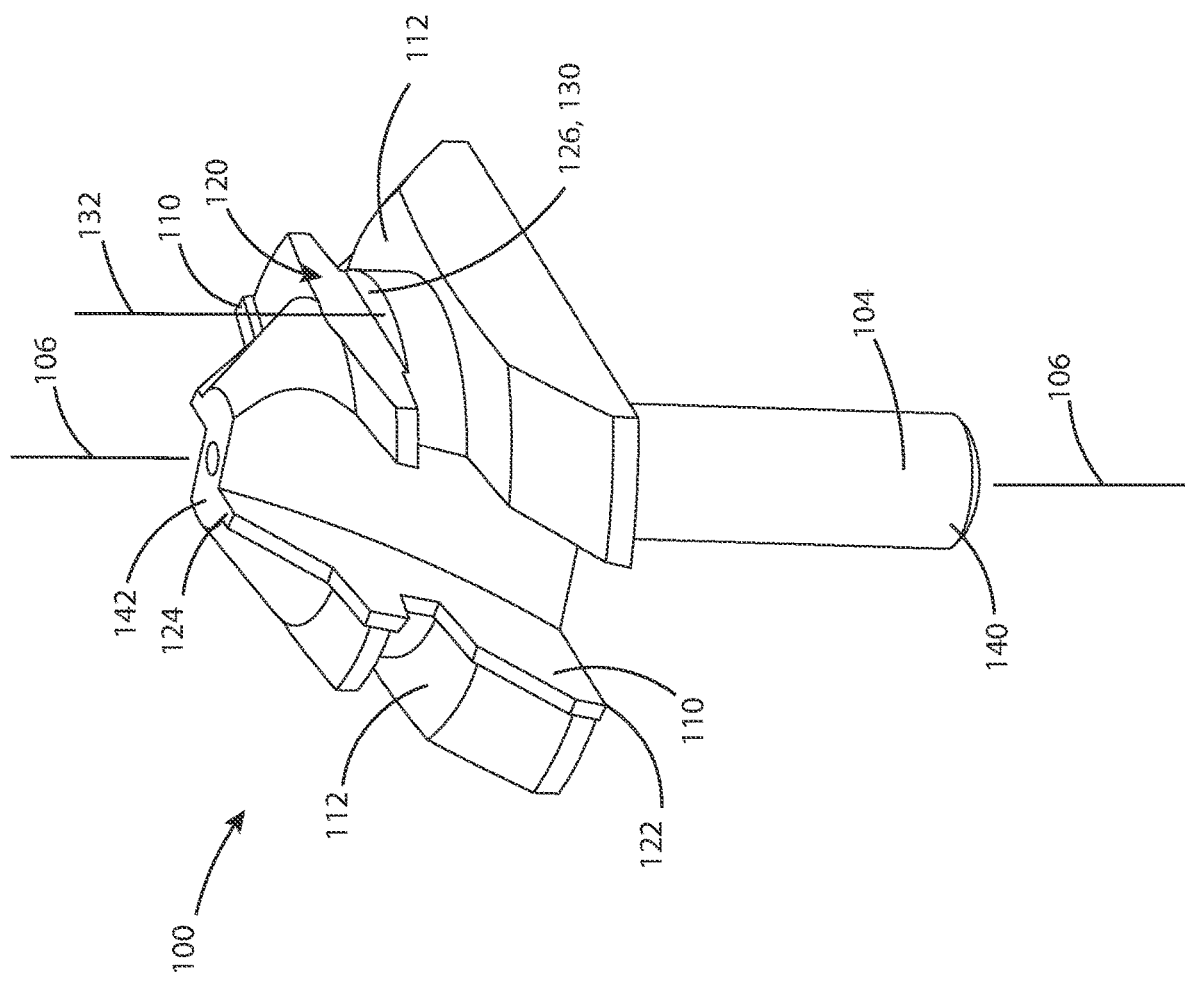
FIG. 1 is a perspective view of an example embodiment of a router bit with an example embodiment of an indexing feature.

The present inventor has created unique and innovative router bits and shaper heads with an indexing feature that enables accurate alignment of a cutter of the router bit or shaper head with an edge of a workpiece. The indexing feature provides a reference point on the router bit that can be used to position the cutter of the router bit or shaper head relative to a work surface. A workpiece will rest on the work surface during a routing operation. As such, positioning the indexing feature relative to the work surface naturally positions the indexing feature, and hence the cutter, relative to the workpiece.

Workpieces often vary in thickness throughout the workpiece and from one workpiece to another workpiece. As a result, router bits or shaper heads are often set up by aligning the center of the cutter with a midpoint of the workpiece being routed. As used herein, the center of the cutter is the axial center relative to a longitudinal axis of the shank of the router bit, between bitter ends of the cutter. The cutter is the part of the router bit or shaper head having an edge that is a cutting edge. In the example embodiments disclosed herein, the machine is a router or shaper, however, the principles disclosed herein may be used with other machines. Since the workpiece will rest on a work surface when being routed or shaped, one simply needs to vertically position the body of the router or shaper head so that the center of the cutter coincides with the center of the workpiece when the workpiece is on the work surface. To do this, one determines the thickness of the workpiece and divides that in half to get a "half thickness." The body of the router or shaper head is then vertically adjusted so that the center of the cutter is disposed at a distance that puts it the half thickness above the work surface. When the workpiece is placed on the work surface, the midpoint of the workpiece will then coincide with the center of the cutter.

However, some cutters have a profile that does not have a discernable feature at the center that can be used as a reference point. Sometimes, for example, the cutter profile is smooth and angled (not perpendicular to the longitudinal axis) at the center of the cutter. Without a discernible reference point, proper alignment of the cutter is difficult and may require a hit or miss approach until the proper position is reached. The router bits or shaper heads disclosed herein have an indexing feature built into the router bit or shaper head at a location other than the cutter itself such as the shank or a body of the router which secures the cutter to the shank, or a body of a shaper head. The indexing feature can be used to position the cutter relative to the work surface and thereby properly align the cutter with the workpiece.

In example embodiments used herein, the indexing feature is located at the midpoint of the cutter. This simplifies the explanation because the midpoint of the cutter naturally coincides with the half thickness of the workpiece. However, the indexing feature can be located at any point between and including the bitter ends of the cutter. Stated another way, the indexing feature may be at a location that is offset from the axial center by an offset amount. If the offset is known, then the reference feature should be positioned at a distance from the work surface that is the half thickness plus (or minus) the offset. For example, the offset from the center of the cutter is 0.1" (toward the base of the shank that goes into the collet). If the half thickness of the workpiece is one half (½) an inch, the indexing feature will be located at 0.4" (the half thickness minus the offset) above the work surface. Hence, while embodiments discussed below place the indexing feature at the center of the cutter, the indexing feature can be at any location along the cutter. This allows for positioning of the indexing feature at alternate locations when, for example, it is relatively difficult or impossible to place the indexing feature at the center.

Figure 2:
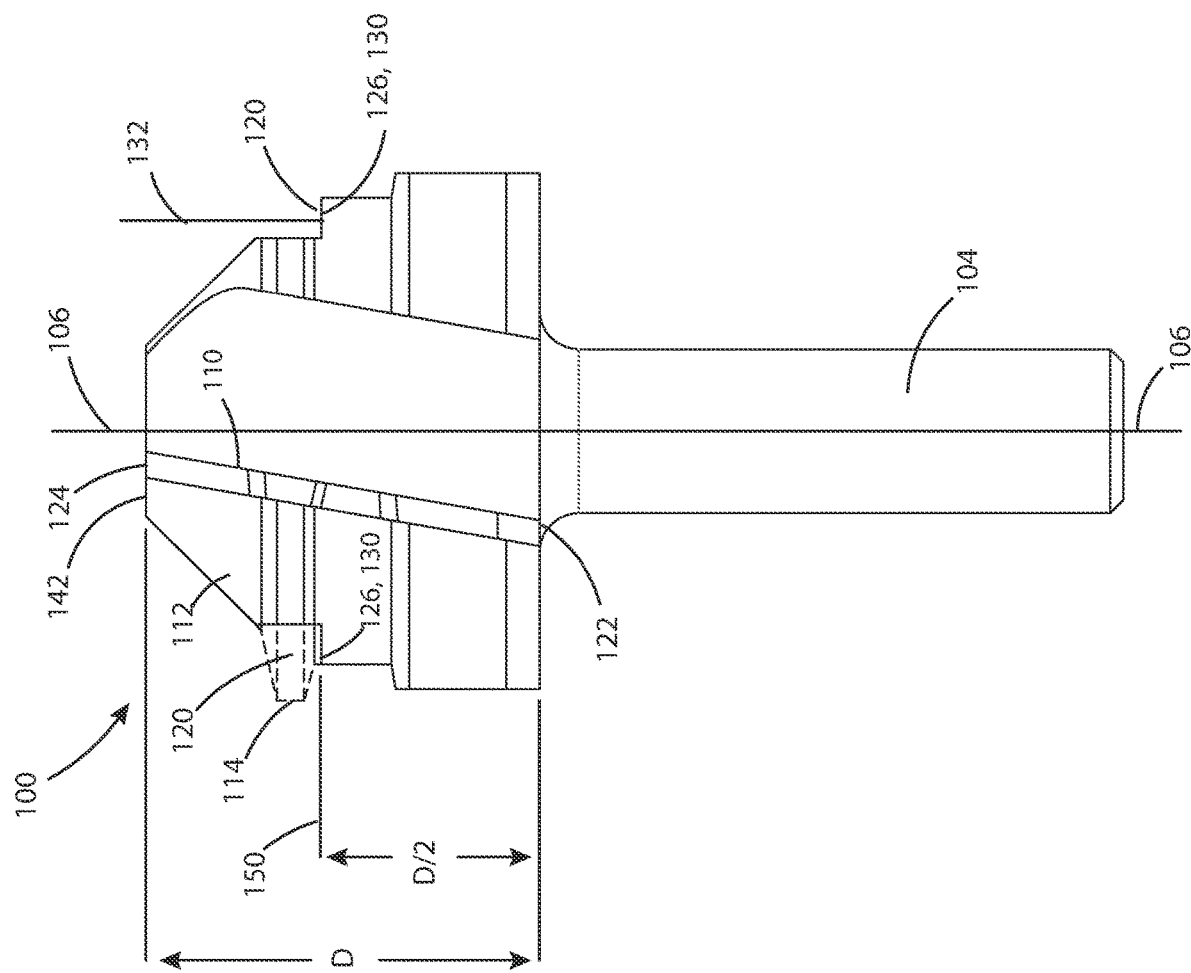
FIG. 2 is a side view of the router bit of FIG. 1.
Figure 3:
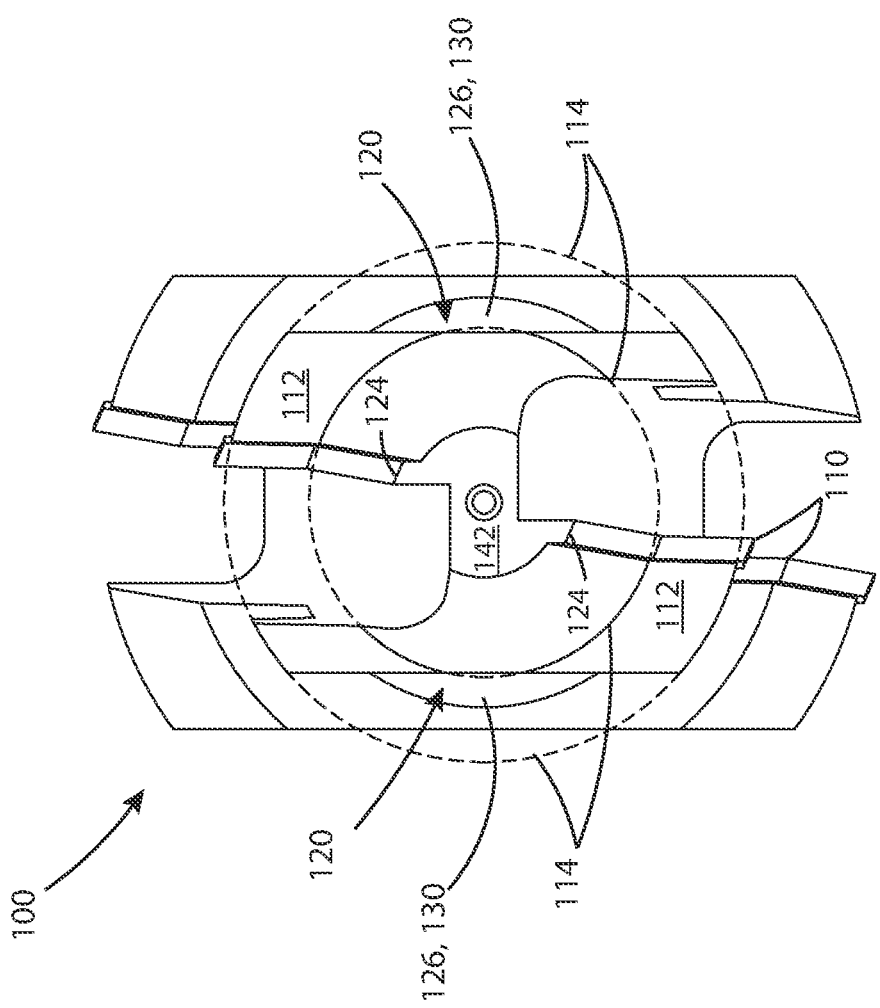
FIG. 3 is an end view of the router bit of FIG. 1.

FIG. 1 to FIG. 3 show an example embodiment of a router bit with an example embodiment of an indexing feature. The router bit 100 includes a shank 104 that defines a longitudinal axis 106, a cutter 110, and a body 112 that secures the cutter 110 to the shank 104. It is noted that the cutters 110 in the example embodiments of FIG. 1 to FIG. 3 are identical, though this need not be the case. When spun about the longitudinal axis 106, the body 112 defines a sweep 114. As used herein, a sweep is a (hollow) shape made by a radially outer boundary of the object making the sweep. As best seen in FIG. 2, a recess 120 is locally recessed into the body 112 relative to the sweep 114 of the body 112. The recess 120 is disposed between a collet bitter end 122 of the cutter 110 and a tip bitter end 124 of the cutter 110 and comprises an indexing feature 126. It should be noted that the sweep of the body 112 is set back from an edge and corresponding sweep (not shown) of the cutter 110. This is because the radial outer boundary of the cutter 110 is naturally radially farther out than that of the body 112. As can be best seen in FIG. 3, there may be more than one recess 120 and associated indexing feature 126. This may, for example, provide better symmetry and associated balance to the router bit 100. However, symmetry is not necessary. Instead, there may be one, or any number more than one of the indexing features 126.

In this example embodiment, the indexing feature 126 is embodied as a flat surface 130 oriented perpendicular to the longitudinal axis 106. Since it is perpendicular to the longitudinal axis 106, a normal 132 of the flat surface 130 is parallel to the longitudinal axis 106. A flat surface 130 is suitable as a reference surface for gauges that are measuring from the work surface because the gauge can land on any part of the flat surface 130 and still get the same distance measurement.

In the example embodiment shown, a proximal end 140 of the router bit 100 is configured to be inserted into a router, and the flat surface 130 faces a distal end 142 of the router bit 100 that is opposite the proximal end 140. As best seen in FIG. 2, the indexing feature 126 is located at a midpoint 150 (D/2, a.k.a. the center) between collet bitter end 122 of the cutter 110 and a tip bitter end 124 of the cutter 110. In this example embodiment, the router bit 100 is configured to cut a lock miter joint, but other router bits may be used.

As noted above, the recess 120 may be located at a non-zero offset from the midpoint 150. Moreover, the indexing feature 126 may be different than a flat surface (e.g., a corner) as is detailed below. The indexing feature 126 may alternately axially coincide with a feature of a sweep formed by the cutter profile such as an inflection point etc. as is detailed below.

Figure 4:
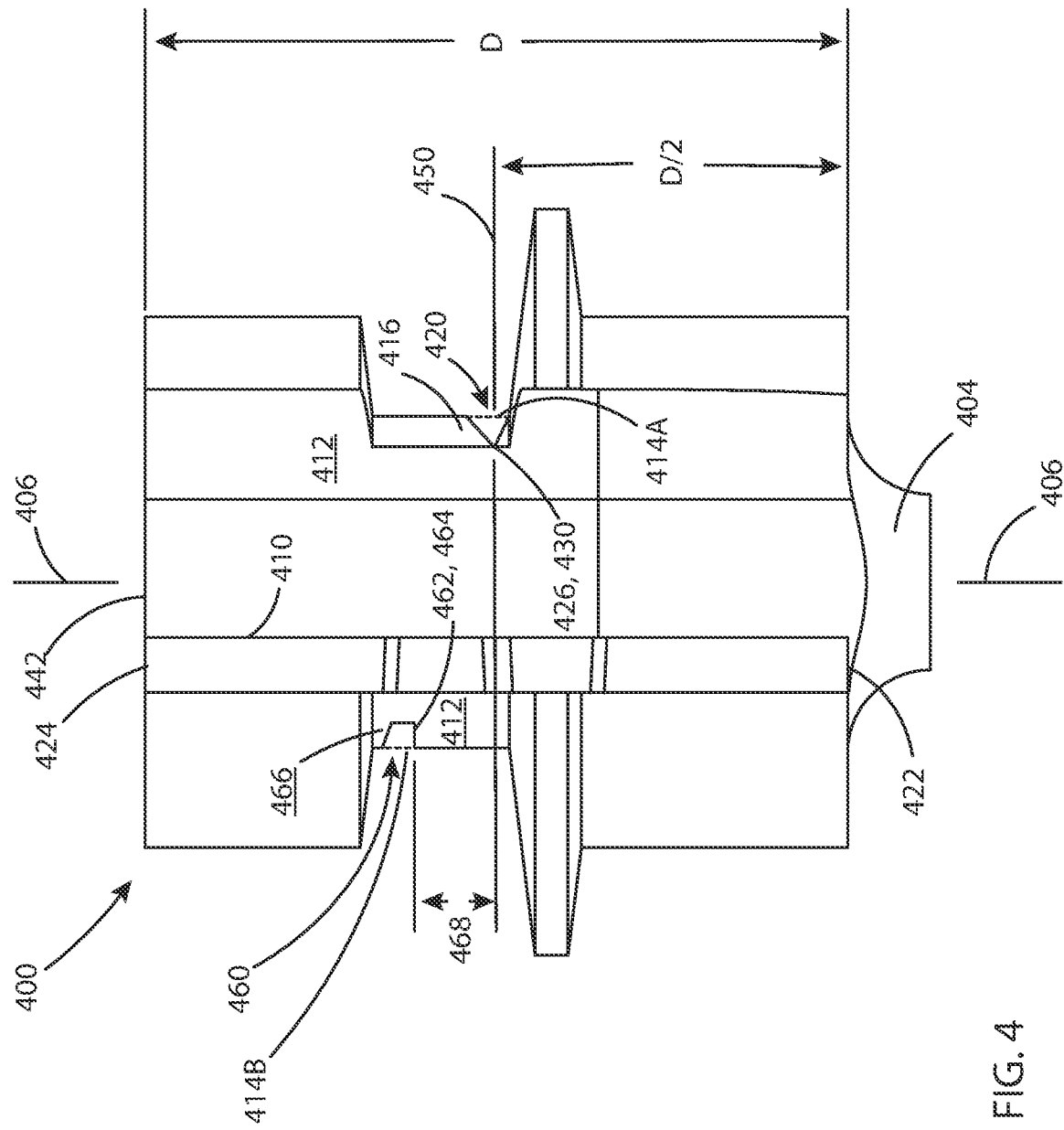
FIG. 4 is a side view of an alternate example embodiment of a router bit with example embodiments of the indexing feature.

FIG. 4 is a side view of an alternate example embodiment of a router bit with example embodiments of the indexing feature. The router bit 400 includes a shank 404 that defines a longitudinal axis 406, a cutter 410, a body 412 that secures the cutter 410 to the shank 404, a collet bitter end 422 of the cutter 410, a tip bitter end 424 of the cutter 410, a proximal end (not visible) of the router bit 400, and a distal end 442 of the router bit 400 that is opposite the proximal end 440.

A first recess 420 includes an indexing feature 426 embodied as a corner 430 of the first recess 420 and disposed at the midpoint 450 (D/2, a.k.a. the center) between collet bitter end 422 of the cutter 110 and a tip bitter end 424 of the cutter 410. The first recess 420 is recessed both from a sweep 414A of the body 412 and recessed from a local surface 416 of the body 412 surrounding the first recess 420. An indexing feature 426 embodied as a corner is suitable for a gauge with a pointed pointer. The pointed pointer may interlock/cooperate with the corner 430 so the router bit 400 can be accurately positioned.

A second recess 460 includes an indexing feature 462 embodied as a flat surface 464. The second recess 460 is recessed both from a sweep 414B of the body 412 and recessed from a local surface 466 of the body 412 surrounding the first recess 420. The second recess 460 is disposed at an offset 468 from the midpoint 450 (D/2, a.k.a. the center) between collet bitter end 422 of the cutter 110 and a tip bitter end 424 of the cutter 410. As this example embodiment shows, there may be more than one indexing feature on a router bit, they may be at the same or different axial locations, and they may have the same or different shapes. Further, the indexing features may be at different radial distances from the longitudinal axes 406.

FIG. 5 to FIG. 9 show various example embodiments a router bit with example embodiments of the indexing feature. In these example embodiments, the router bit is configured to cut a butterfly shape, but the indexing features can be used with router bits configured to cut other shapes. The principles are discussed in depth with respect to FIG. 5 and apply to FIG. 5 to FIG. 9. The router bit 500 includes a shank 504 that defines a longitudinal axis 506, a cutter 510, a body 512 that secures the cutter 510 to the shank 504, a collet bitter end 522 of the cutter 510, a tip bitter end 524 of the cutter 510, a proximal end 540 of the router bit 500, and a distal end 542 of the router bit 500 that is opposite the proximal end 540.

Figure 5:
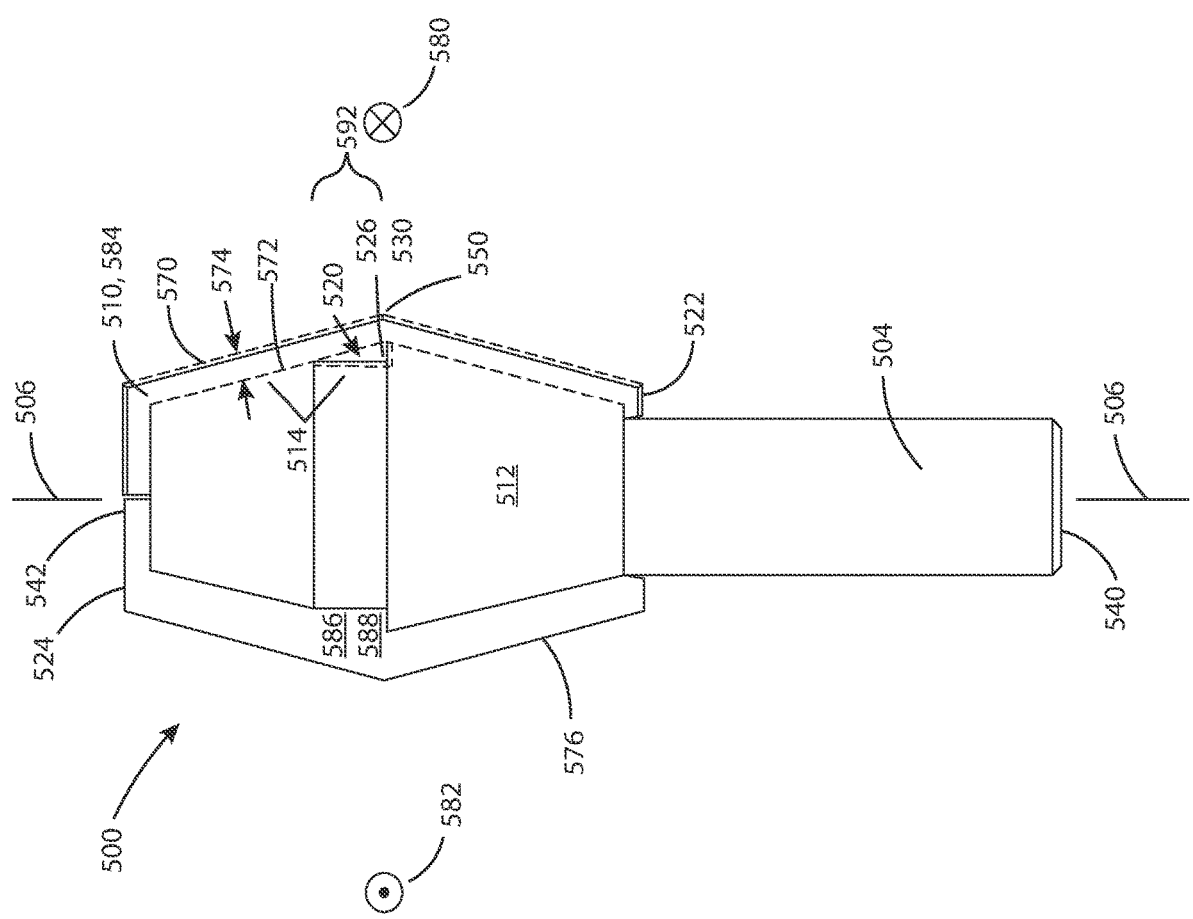
FIG. 5-9 are side views of various alternate example embodiments of a router bit with respective example embodiments of the indexing feature.

As shown in FIG. 5., the cutter 510 defines a cutter sweep 570 (shown under a dotted line) when the router bit 500 a spun about the longitudinal axis 506. A design setback sweep 572 (shown under the dotted line) is set back by a setback 574 from the cutter sweep 570 and extends from one bitter end of the body 512 to the other bitter end of the body 512. The design setback sweep 572 follows a profile of the cutter sweep 570. The setback 574 may be the same amount or may vary in different sections of the design setback sweep 572. The design setback sweep 572 defines a body sweep of conventional router bodies. In other words, the radially outermost portion of the body of a conventional router bit follows the design setback sweep 572. The radially outermost portion of the body is that portion shown in FIG. 5 closest to a cutting edge of the cutter 510. As used herein, follows can mean that for every feature in the shape of the cutter sweep 570 there is a corresponding feature in the shape of the design setback sweep 572, even if the relationship includes a variation in the magnitude of the setback 574. Likewise, for every feature in the shape of the design setback sweep 572, there is a feature corresponding feature in the shape of the cutter sweep 570.

As shown in FIG. 5, the cutter 510 rotates into the page on the right side as shown by arrow tail 580. Upon half a rotation the cutter 510 would be rotating out of the page on the left side as shown by arrowhead 582. The radially outermost portion of the body 512 (shown under the dotted/dashed lines) is disposed on a back/support side 584 of the cutter 510 that is opposite a cutting face (not visible) of the cutter 510. The radially outermost portion of the body 512 exists to provide support to the cutter 510 as the cutter 510 cuts the workpiece. The rest of the body 512 may or may not taper radially inward with circumferential distance toward the cutter face 586 of a second cutter 588. In the example embodiment shown in FIG. 5, the body 512 does taper radially inward. This creates a larger setback 576 at the cutter face 586 of the second cutter 588 which helps ensure the body 512 is clear material being removed from the workpiece. It is noted that the cutters 510, 588 in the example embodiments of FIG. 5 to FIG. 9 are identical, though this need not be the case.

Unlike conventional router bits where the body sweep is controlled by (e.g., follows) the design setback sweep 572, in this example embodiment, the body sweep 514 includes a recess 520 locally recessed into the body 512 from the design setback sweep 572 in a portion 592 of the design setback sweep 572. Stated another way, unlike conventional router bits, the body sweep 514 in this example embodiment does not follow the entire design setback sweep 572. Instead, the body sweep 514 locally deviates from the design setback sweep 572 in portion 592 of the design setback sweep 572. In other words, the body sweep 514 includes at least one feature for which there is no corresponding feature in the cutter sweep 570.

The recess 520 includes the indexing feature 526. In the example embodiment shown in FIG. 5, the indexing feature 526 includes a flat surface 530 like the flat surface 130 of FIG. 1 to FIG. 3 that is perpendicular to the longitudinal axis 506 and that faces the distal end 542 of the router bit 500. In this example embodiment, the indexing feature 526 is located at the midpoint 550 between the proximal end 540 of the router bit 500, and the distal end 542 of the router bit 500. However, any location along the longitudinal axis 506 would suffice. The cutter 510 includes an inflection point 594 (e.g., a point/peak) at the midpoint 550, so the indexing feature 526 is coaxially located with the inflection point 594.

In a conventional router bit, since the body and body sweep follow the design setback sweep 572, the body sweep would have a point at the midpoint 550 that matches the point on the design setback sweep 572 and thereby the point on the cutter 510. However, as can be seen in FIG. 5, the body 512 and body sweep 514 have a point that is different from the point on the design setback sweep 572 and thereby the cutter 510. Specifically, the angle that defines the point on the body sweep 514 is half the angle that defines the point on the design setback sweep 572 and thereby the cutter 510. At the location of the indexing feature, the shape of the body sweep 514 is thereby naturally different than the shape of the design setback sweep 572, the cutter sweep 570, and the cutter 510.

Figure 6:
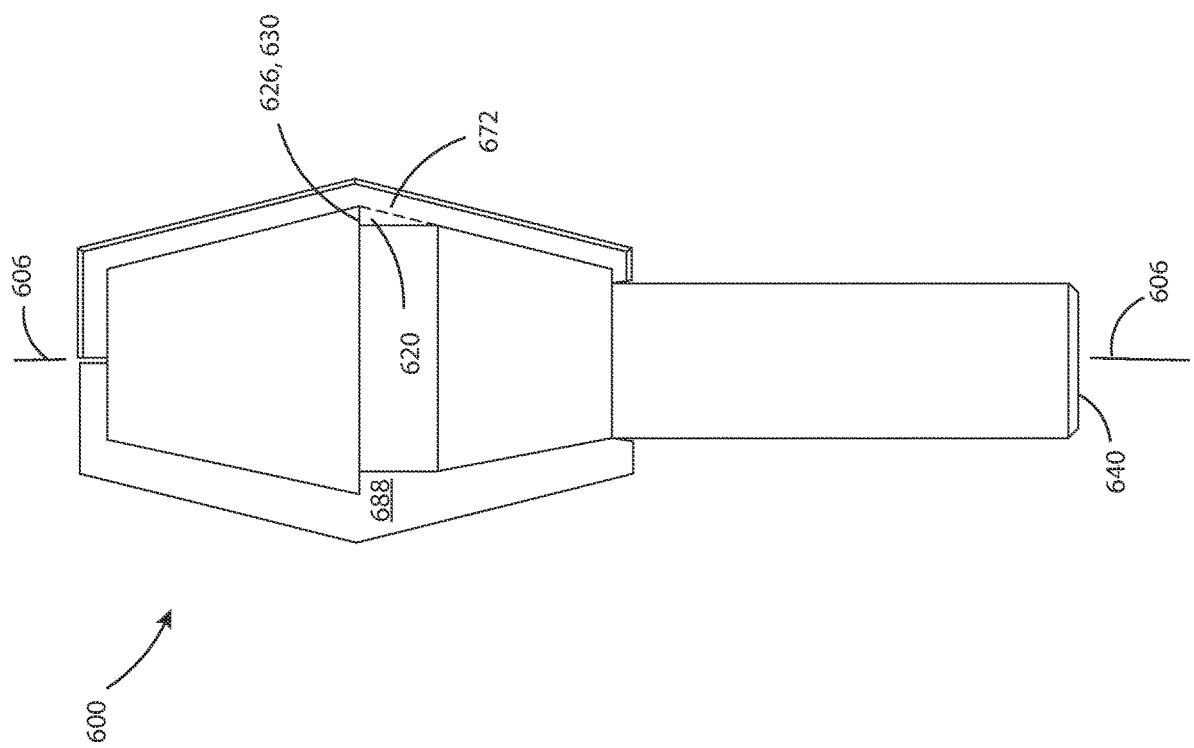

FIG. 6 shows an alternate example embodiment of a router bit 600 with a recess 620 and an indexing feature 626 embodied as a flat surface 630. The recess 620 of this example embodiment is recessed relative to the design setback sweep 672 and extends to the second cutter 688 similar to that of the example embodiment of FIG. 5. The flat surface 630 is perpendicular to the longitudinal axis 606, but in this example embodiment, the flat surface 630 faces toward the proximal end 640 of the router bit 600.

Figure 7:
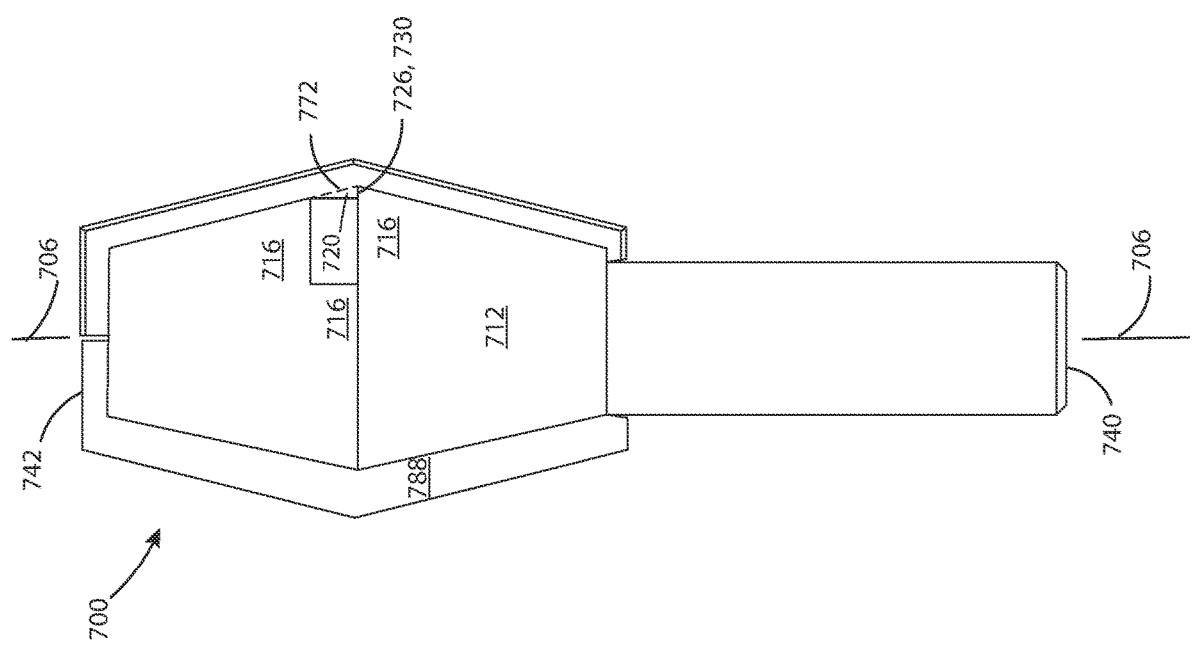

FIG. 7 shows an alternate example embodiment of a router bit 700 with a recess 720 and an indexing feature 726 embodied as a flat surface 730. The recess 720 of this example embodiment is recessed both relative to the design setback sweep 772 and locally relative to a local surface 716 of the body 712 surrounding the recess 720. The flat surface 730 is perpendicular to the longitudinal axis 706 and faces toward the distal end 742 (away from the proximal end 740) of the router bit 700. The recess 720 of this example embodiment does not extend all the way to the second cutter 788.

Figure 8:
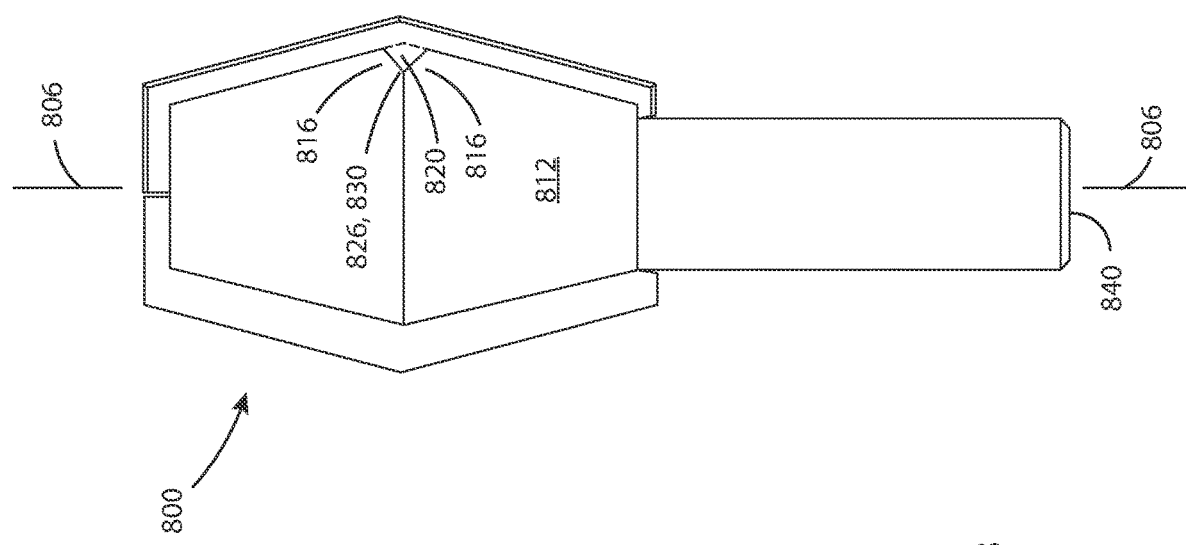

FIG. 8 shows an alternate example embodiment of a router bit 800 with a longitudinal axis 806 and a proximal end 840. The router bit 800 has a recess 820 that opens radially outward and an indexing feature 826 embodied as a corner 830. The recess 820 of this example embodiment is recessed both relative to the design setback sweep 872 and locally relative to a local surface 816 of the body 812 surrounding the recess 820.

Figure 9:
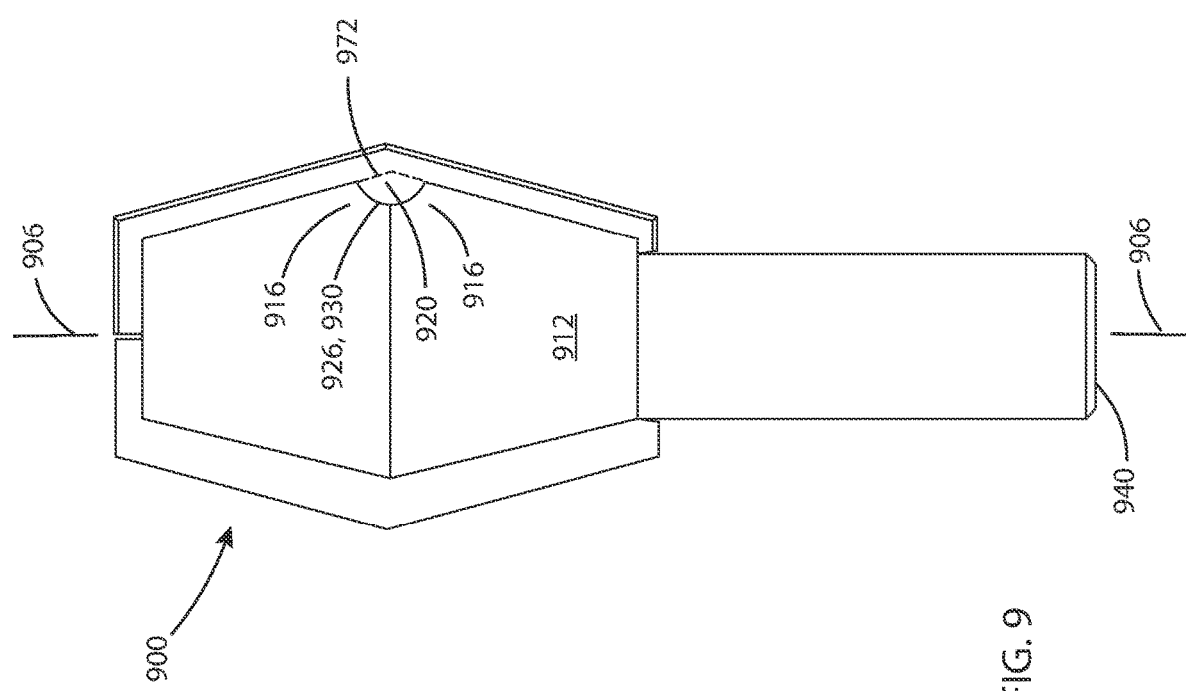

FIG. 9 shows an alternate example embodiment of a router bit 900 with a longitudinal axis 906 and a proximal end 940. The router bit 900 has a recess 920 that opens radially outward and an indexing feature 926 embodied as a curved surface 930. The recess 920 of this example embodiment is recessed both relative to the design setback sweep 972 and locally relative to a local surface 916 of the body 912 surrounding the recess 920. In this example embodiment, the indexing feature 926 is configured to cooperate with pointer of a measuring tool. Such cooperation aligns the pointer with the indexing feature by, for example, geometric cooperation therebetween. For example, the pointer may be shaped in a mirror/reverse shape of the indexing feature 926 so that the pointer has a convex surface that nests into the indexing feature 926. When the intended nesting is reached, the pointer is properly aligned with the indexing feature 926.

While the indexing feature 926 in this example embodiment has a concave curved shape, any shape can be used so long as a suitably shaped pointer can cooperatively interact with the indexing feature 926 to result in the proper alignment therebetween. Further, the pointer need not have the exact same shape as the indexing feature 926 to achieve the proper alignment. For example, the indexing feature 926 could be in the shape of a V-groove (e.g., FIG. 8) or have three sides of a square and the pointer could be shaped like a sphere and properly cooperate/fit therein to achieve the proper alignment.

Figure 10:
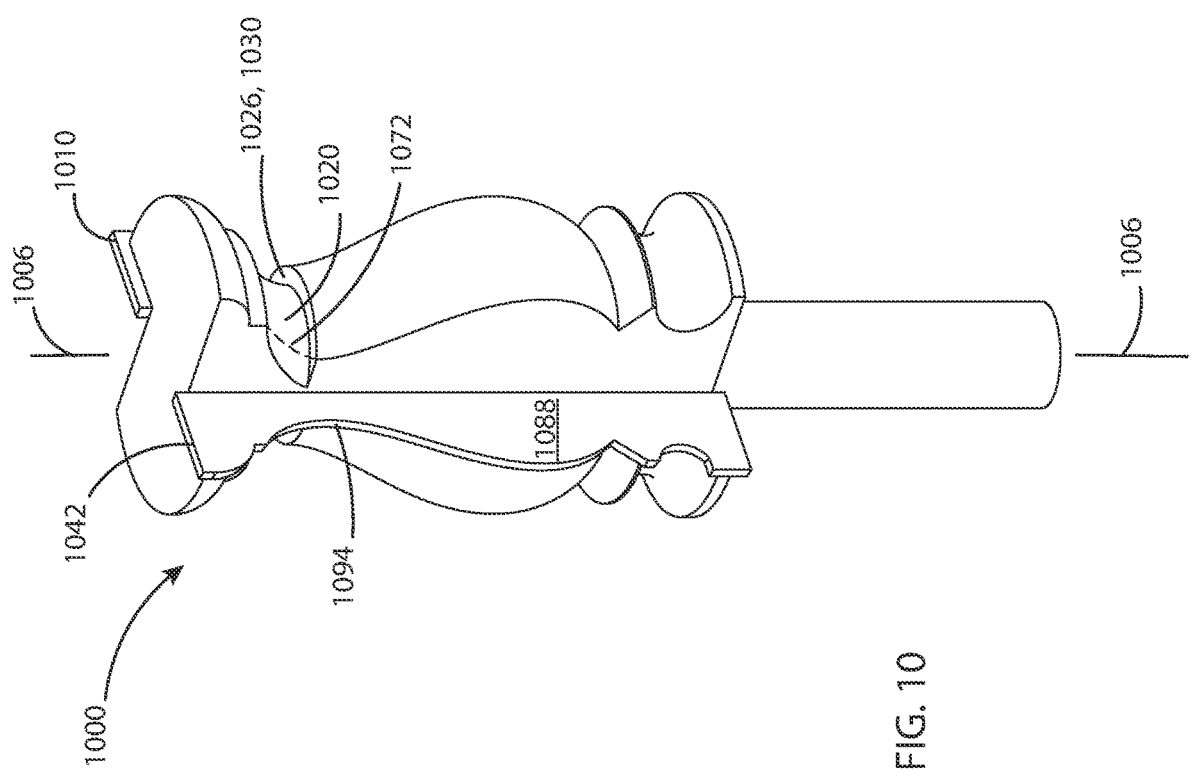
FIG. 10 is a perspective view of an alternate example embodiment of a router bit with an example embodiment of the indexing feature.

FIG. 10 shows an alternate example embodiment of a router bit 1000 with a recess 1020 and an indexing feature 1026 embodied as a flat surface 1030. The recess 1020 of this example embodiment is recessed relative to the design setback sweep 1072 and extends from the cutter 1010 to the second cutter 1088. The design setback sweep 1072 is shown here at the downstream/other end of the recess 1020 instead of at the cutter 1010. This is because in this example embodiment the body 1012 does not taper radially inward toward the second cutter 1088. As such, at a given location relative to the longitudinal axis 1006, the radially outer edge of the body 1012 remains at the same radial distance from the longitudinal axis 1006. The flat surface 1030 is perpendicular to the longitudinal axis 1006 and faces toward the distal end 1042 of the router bit 1000. The location of the indexing feature 1026 coincides with the location of an inflection point 1094 of a curve in the cutter 1010 and associated sweep formed by the cutter relative to the longitudinal axis 1006. It is noted that the cutters 1010, 1088 are identical in this example embodiment, so the inflection point 1094 on the second cutter 1088 coincides with a same inflection point on the cutter 1010.

Figure 11:
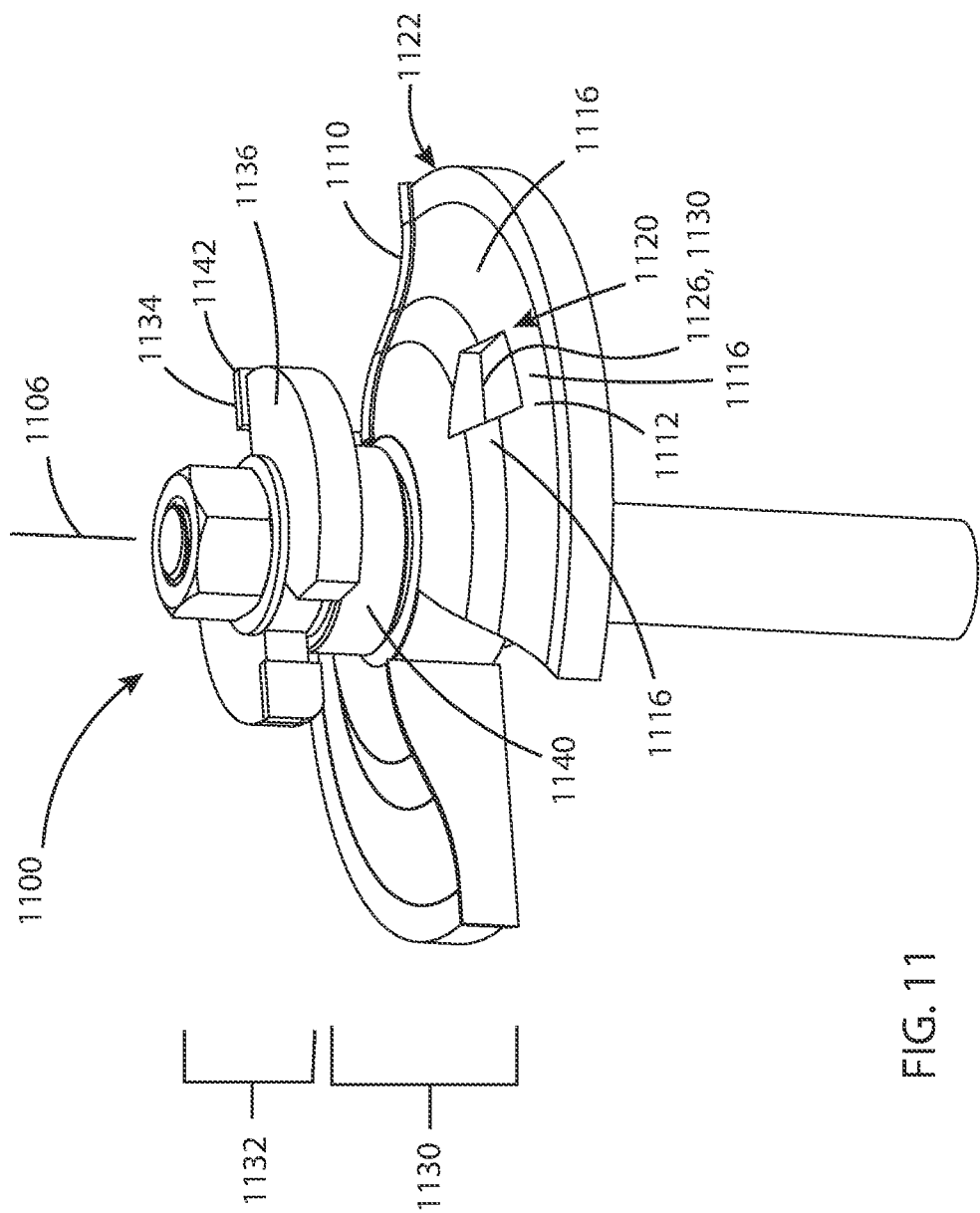
FIG. 11 is a perspective view of an alternate example embodiment of a router bit with an example embodiment of the indexing feature.

FIG. 11 shows an alternate example embodiment of a router bit 1100 with a recess 1120 that opens radially outward and an indexing feature 1126 embodied as a corner 1130. The recess 1120 of this example embodiment is recessed locally relative to the local surface 1116 of the body 1112 surrounding the recess 1120. The router bit 1100 has a first cutter/body arrangement 1130 with the cutter 1110 and the body 1112, and a second cutter/body arrangement 1132 having a second cutter 1134 and a second body 1136. The first cutter/body arrangement 1130 and the second cutter/body arrangement 1132 are discrete each other. The first cutter/body arrangement 1130 and the second cutter/body arrangement 1132 occupy discrete portions of the length of the router bit 1100 along the longitudinal axis 1106 and are separated by a bearing 1140 configured to roll on an edge of the workpiece between portions of the workpiece being routed. The location of the indexing feature 1126 can be selected to be a midpoint between bitter ends of the cutter 1110, or a midpoint with an offset as detailed above.

Alternately, the location of the indexing feature 1126 can be selected to be a midpoint between the collet bitter end 1122 of the cutter 1110 and a tip bitter end 1142 of the second cutter 1134. Likewise, the location of the indexing feature 1126 can be selected to be the midpoint between the collet bitter end 1122 of the cutter 1110 and the tip bitter end 1142 of the second cutter 1134 with an offset. The latter may be suitable in instances like that shown in FIG. 11, where it may be difficult or impossible to locate the indexing feature 1126 at the midpoint of both cutters 1110, 1142 due to the presence of the bearing 1140 or the like. Considering all the cutters on the router bit when choosing the location of the indexing feature 1126 allows for indexing relative to the entire cutting sweep/profile of the router bit 1100 instead of the cutting sweep/profile of one cutter of the router bit 1100.

In the embodiment shown in FIG. 11, the cutter 1110 is one of two cutters in the first cutter/body arrangement 1130. The two cutters are identical and hence interchangeable as used to this point. The same applies to the cutters of the second cutter/body arrangement 1132. However, it is possible that a single cutter/body arrangement can have two or more different cutters attached to the same body. For example, the different cutters may have different shapes at different axial locations. Alternately, or in addition, the different cutters may have different shapes but be at the same or overlapping axial positions. Such a cutter arrangement includes progressive cutters where each cutter cuts only a portion of the final profile that the router bit as a whole cuts. Applying the principles detailed above, the indexing feature can be located relative to the midpoint (with or without an offset) of any one of the cutters, relative to the midpoint (with or without an offset) of any combination of the cutters, and/or relative to the midpoint (with or without an offset) of all of the cutters taken as a whole.

FIGS. 12A and 12B collectively depict the operation of a first router bit 1200A and a cooperating second router bit 1200B to form a single edge profile 1202 in a workpiece 1204. The first router bit 1200A defines a first cutter sweep 1210A from the collet bitter end 1212A to a reference location 1214A. The first cutter sweep 1210A routs a first half 1220A of the edge profile 1202 in the edge of the workpiece 1204.

The second router bit 1200B defines a second cutter sweep 1210B from the collet bitter end 1212B to a reference location 1214B. The second cutter sweep 1210B routs a second half 1220B of the edge profile 1202 in the edge of the workpiece 1204. A workpiece reference point 1222 is established in the edge profile 1202 to coincide with the reference location 1214A in the first router bit 1200A and the reference location 1214B in the second router bit 1200B.

The workpiece reference point 1222 may be expected to be at a particular location within the thickness of the workpiece 1204, (e.g., the midpoint, the ⅓ mark, the ¼ mark etc.). The reference location 1214A must be aligned with the workpiece reference point 1222 (e.g., the midpoint, the half thickness) before the first half 1220A can be routed. Then, to rout the second half 1220B, the reference location 1214B of the second router bit 1200B must be aligned with the workpiece reference point 1222, after which the second half 1220B can be routed. Such alignments can be tedious, difficult, and/or a hit or miss process.

In the example embodiment of FIGS. 12A and 12B, a recess 1230A having an indexing feature 1232A embodied as a flat surface that is perpendicular to the longitudinal axis 1234A is formed in the body 1236A. The recess 1230A of this example embodiment is recessed relative to the design setback sweep. The indexing feature 1232A is collocated with the reference location 1214A relative to the longitudinal axis 1234A. Accordingly, to align the first router bit 1200A, the half thickness of the workpiece 1204 is determined, and the indexing feature 1232A is merely located at a distance that corresponds to the half thickness from the work surface 1240. Once this is done, the first half 1220A can be routed.

Likewise, a recess 1230B having an indexing feature 1232B embodied as a flat surface that is perpendicular to the longitudinal axis 1234B is formed in the body 1236B. The recess 1230B of this example embodiment is recessed relative to the design setback sweep. The indexing feature 1232B is collocated with the reference location 1214B relative to the longitudinal axis 1234B. To align the second router bit 1200B, the half thickness of the workpiece 1204 is determined, and the indexing feature 1232B is merely located at a distance that corresponds to the half thickness from the work surface 1240. Once this is done, the workpiece 1204 is flipped over and the second half 1220B can be routed.

As detailed above, the indexing features 1232A, 1232B can be located at the midpoint or at the midpoint plus an offset. Hence, the indexing features 1232A, 1232B can be configured to associate with any workpiece reference point 1222, regardless of where in the thickness of the workpiece the workpiece reference point 1222 is located.

Although the disclosure to this point has related to router bits, this entire disclosure also applies to shaper heads and shaper head assemblies used in woodworking shaper machines. A shaper assembly generates the same type of cut as its counterpart router bit, albeit using a two-piece assembly. Roter bits and shaper cutter heads are collectively referred to herein as cutting bits.

FIG. 13A to FIG. 13F are various views of an example embodiment of a lock miter shaper head assembly 1300 and components thereof with an indexing feature 1326. The shaper head assembly 1300 includes a shaper cutter head 1308 and a shaper spindle 1304. The shaper head assembly 1300 generates the same type of cut as the lock miter router bit of FIG. 1 and operates using the same principles, mutatis mutandis. The shaper spindle 1304 is suitable for use with all shaper heads disclosed herein.

The shaper cutter head 1308 includes multiple cutters 1310 secured to a shaper body 1312; a bore 1314 through the body. While multiple cutters 1310 are shown, there only needs to be one cutter 1310. If multiple cutters are used, where each cutter occupies a different space along the longitudinal axis, then the cutter proximal axial end is the proximal end of the most proximal cutter and the cutter distal end is the distal end of the most distal cutter.

The shaper body 1312 is configured to be releasably secured to via the bore 1314 to the shaper spindle 1304 and when so assembled the shaper body 1312 and the cutters 1316 extend along a longitudinal axis 1330 (e.g., axis of rotation) defined by the shaper spindle 1304.

The shaper body 1312 includes a body proximal end 1340, a body distal end 1342, and further includes multiple recesses 1320 that each define a respective indexing feature 1326 and a respective normal line 1332 extending therefrom. While multiple recesses 1320 are shown, there only needs to be one recess 1320. The indexing feature 1326 is a flat surface that extends perpendicular to the longitudinal axis 1306 such that the normal line 1332 to the flat surface extends parallel to the longitudinal axis 1330. The flat surface indexing feature 1326 is located at a midpoint 1328 (D/2, a.k.a. the exact center) between the cutter distal end 1324 and the cutter proximal end 1322.

Each cutter 1316 includes a cutting edge 1316C having a cutter proximal end 1322 and a cutter distal end 1324. The cutter 1316 defines a miter profile 1338 that includes a groove-cutting portion 1338G and a tongue-cutting portion 1338T.

Figure 13A:
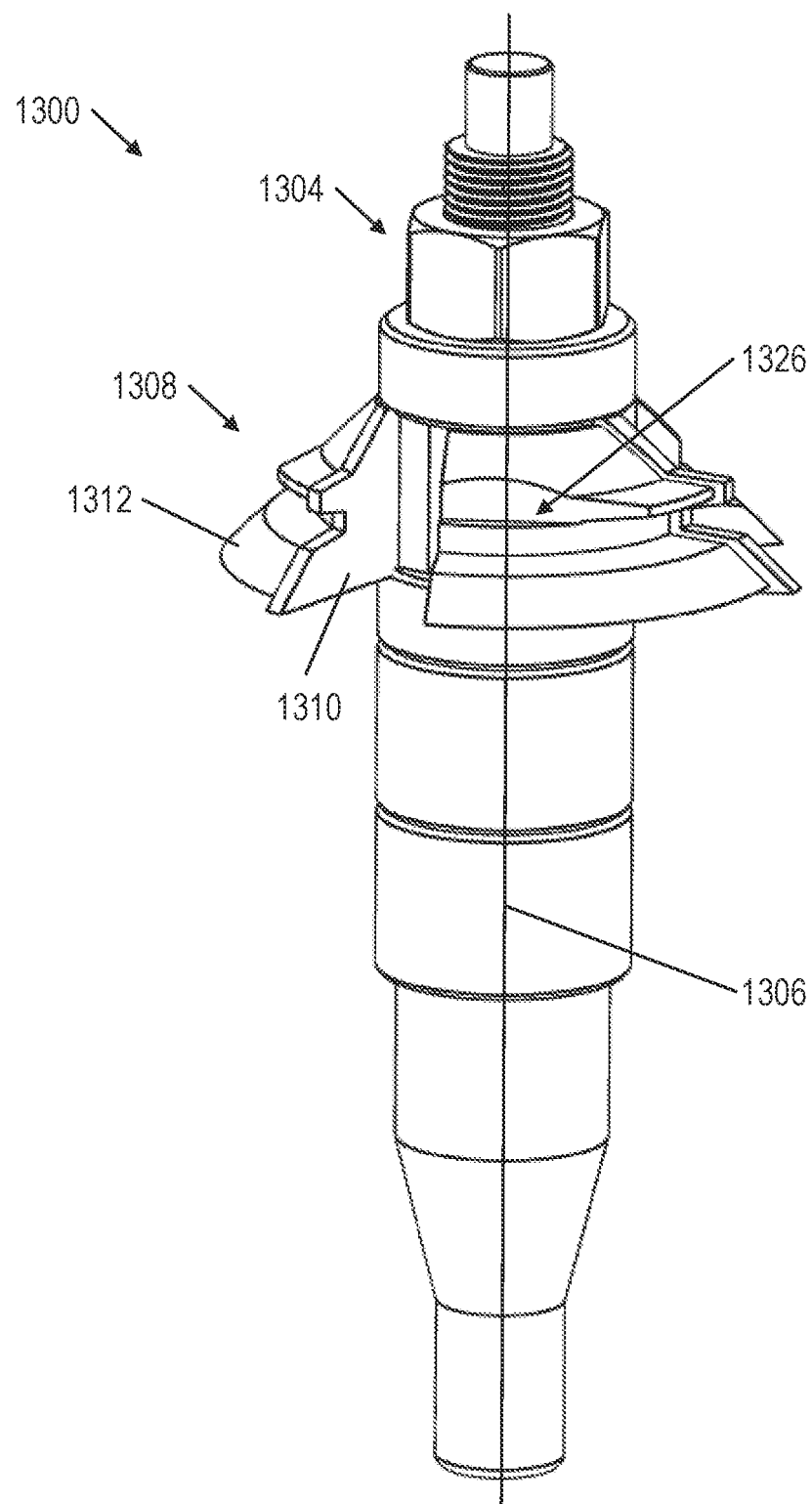
FIG. 13A is a perspective view of an example embodiment of a lock miter shaper head assembly with an example embodiment of an indexing feature.
Figure 13B:
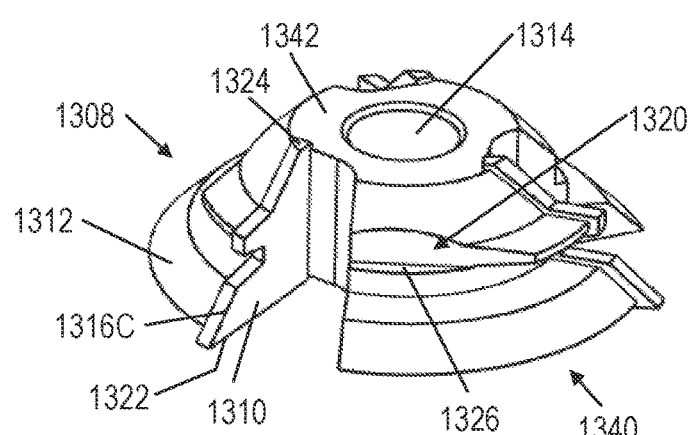
FIG. 13B is a perspective view of a shaper head of the lock miter shaper head assembly of FIG. 13A.
Figure 13C:
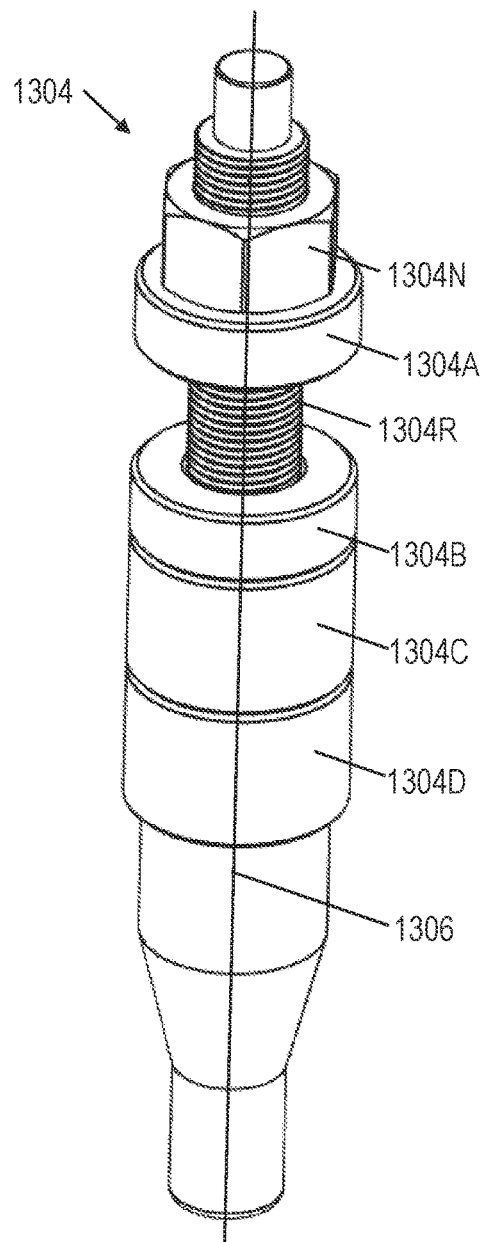
FIG. 13C is a perspective view of a shaper spindle of the lock miter shaper head assembly of FIG. 13A.
Figure 13D:
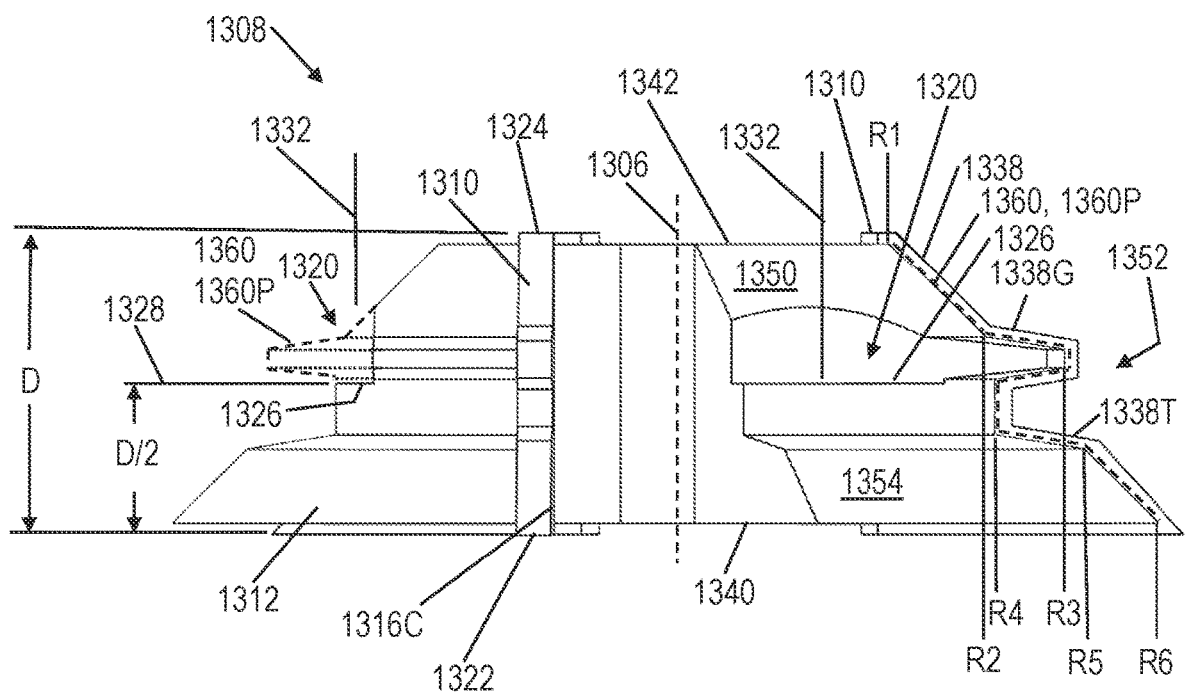
FIG. 13D is a side view of the shaper head of the lock miter shaper head assembly of FIG. 13A.
Figure 13E:
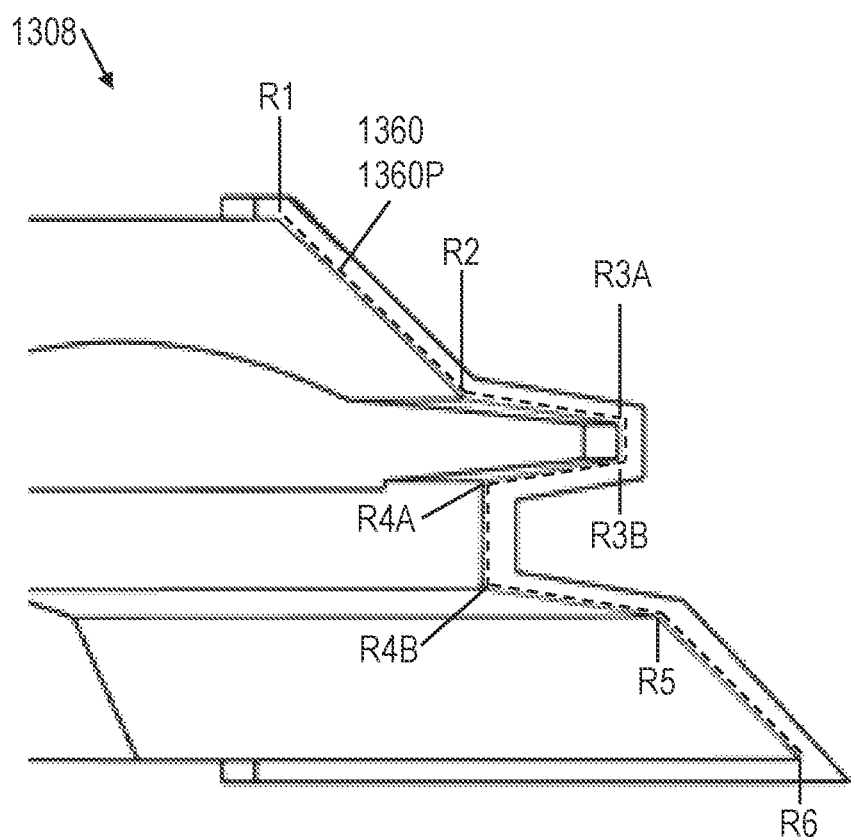
FIG. 13E is a closeup of the shaper head of FIG. 13D.
Figure 13F:
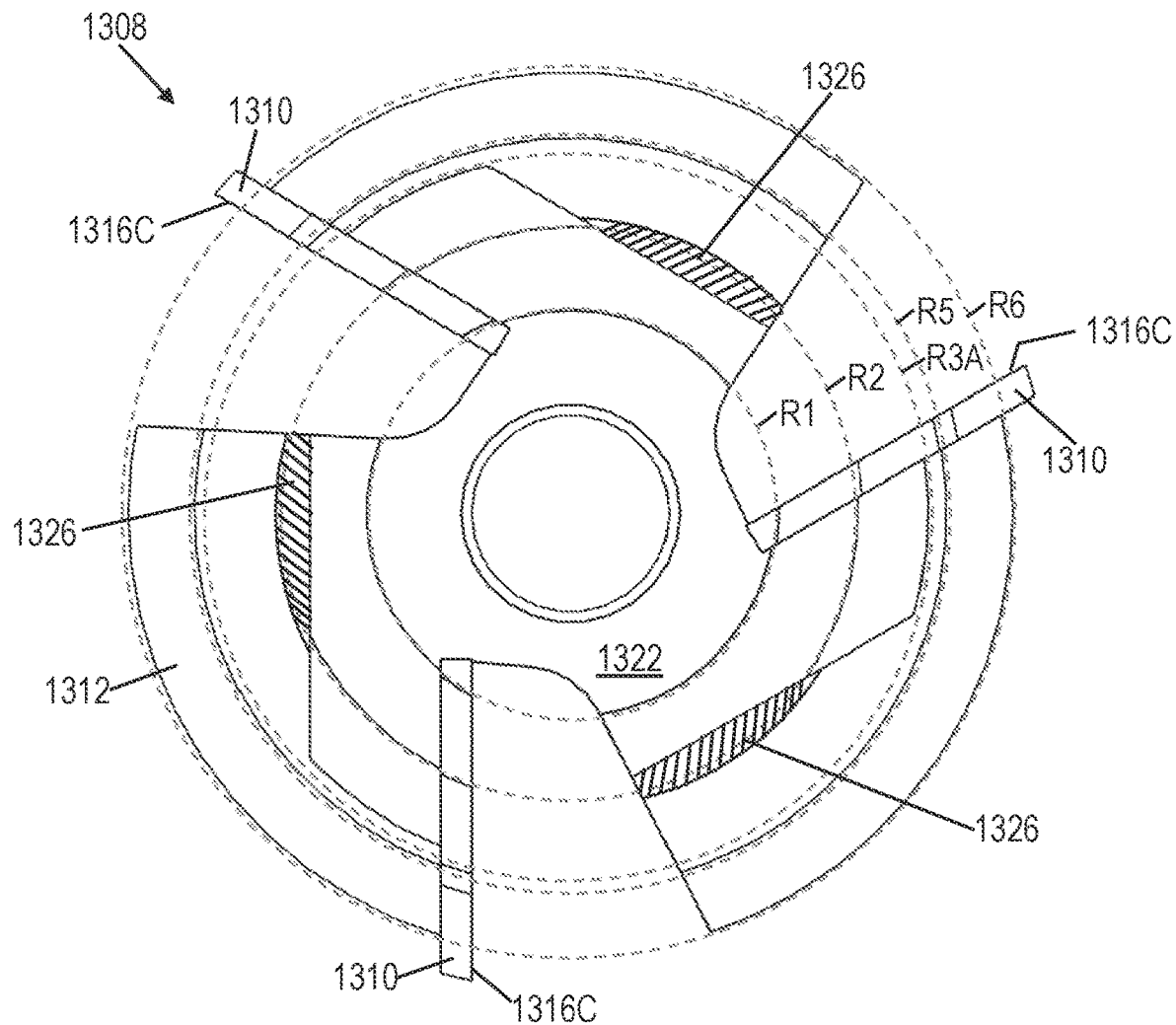
FIG. 13F is a top view of the shaper head of the lock miter shaper head assembly of FIG. 13A.

When spun about the longitudinal axis 1306, the shaper body 1312 defines a body sweep 1360. The outer periphery of the body sweep 1360 is indicated by a dashed path 1360P in FIG. 13D and FIG. 13E. As seen in FIG. 13D and FIG. 13E, the outer periphery forms a path that starts at the body distal end 1342, ends at the body proximal end 1344, forms a continuous path along the periphery of the shaper body 1312, and lies within a radial plane that is parallel to the longitudinal axis 1306 (i.e., parallel to the page in FIG. 13D). The path 1360P extends axially and radially but not circumferentially relative to the longitudinal axis 1330 and connects radiuses R1, R2, R3A, R3B, R4A, R4B, R5, and R6. R3A and R3B are collectively R3. R4A and R4B are collectively R4. Of these, radiuses R1, R2, R3A, R5, and R6 are visible and indicated with dashed lines in FIG. 13E.

As can be seen in the top view of FIG. 13E, the flat surface indexing feature 1326 protrudes radially outward in relation to at least a portion of the shaper body 1312. As is also visible in FIG. 13E, the flat surface indexing feature 1326 exists in a radial location that is between R1 and R3. In the embodiment shown, the flat surface indexing feature 1326 exists on both radial sides of R2 but could exists on only one radial side of R2 but not the other radial side.

As can be seen in the left side of the side view of FIG. 13D, the recess 1320 and the flat surface indexing feature 1326 are both locally recessed relative to the body sweep 1360. As is also visible in FIG. 13D, the shaper body 1312 comprises a substantially fructo-conical first portion 1350 disposed closer to the body distal end 1342, a central portion 1352 adjacent the groove-cutting portion 1338G and the tongue-cutting portion 1338T, and a second portion 1354 closer to the body proximal end 1344.

The shaper spindle 1304 includes a threaded rod 1304R, various spacers 1304A, 1304B, 1304C, 1304D, and a nut 1304N to secure the shaper head assembly 1300 together once the shaper cutter head 1308 is installed thereon.

FIG. 14A to FIG. 14D are various views of an example embodiment of a concave router bit 1400 with an example embodiment of an indexing feature 1426. In this example embodiment, the concave router bit 1400 is a round over bit.

The concave router bit 1400 includes a shank 1404 that defines a longitudinal axis 1406, multiple cutters 1410, a body 1412 that secures the cutters 1410 to the shank 1404, recesses 1420, a cutter proximal end 1422, a cutter distal end 1424, the indexing features 1426, a body proximal end 1440, and a body distal end 1442 that is opposite the body proximal end 1440. While multiple cutters 1410 are shown, there only needs to be one cutter 1410. While multiple recesses 1420 are shown, there only needs to be one recess 1420.

The indexing feature 1426 is a flat surface that extends perpendicular to the longitudinal axis 1406 such that the normal line 1432 to the flat surface extends parallel to the longitudinal axis 1406. The flat surface indexing feature 1426 is located at a midpoint 1428 (D/2, a.k.a. the exact center) between the cutter proximal end 1422 and the cutter distal end 1424.

Figure 14A:
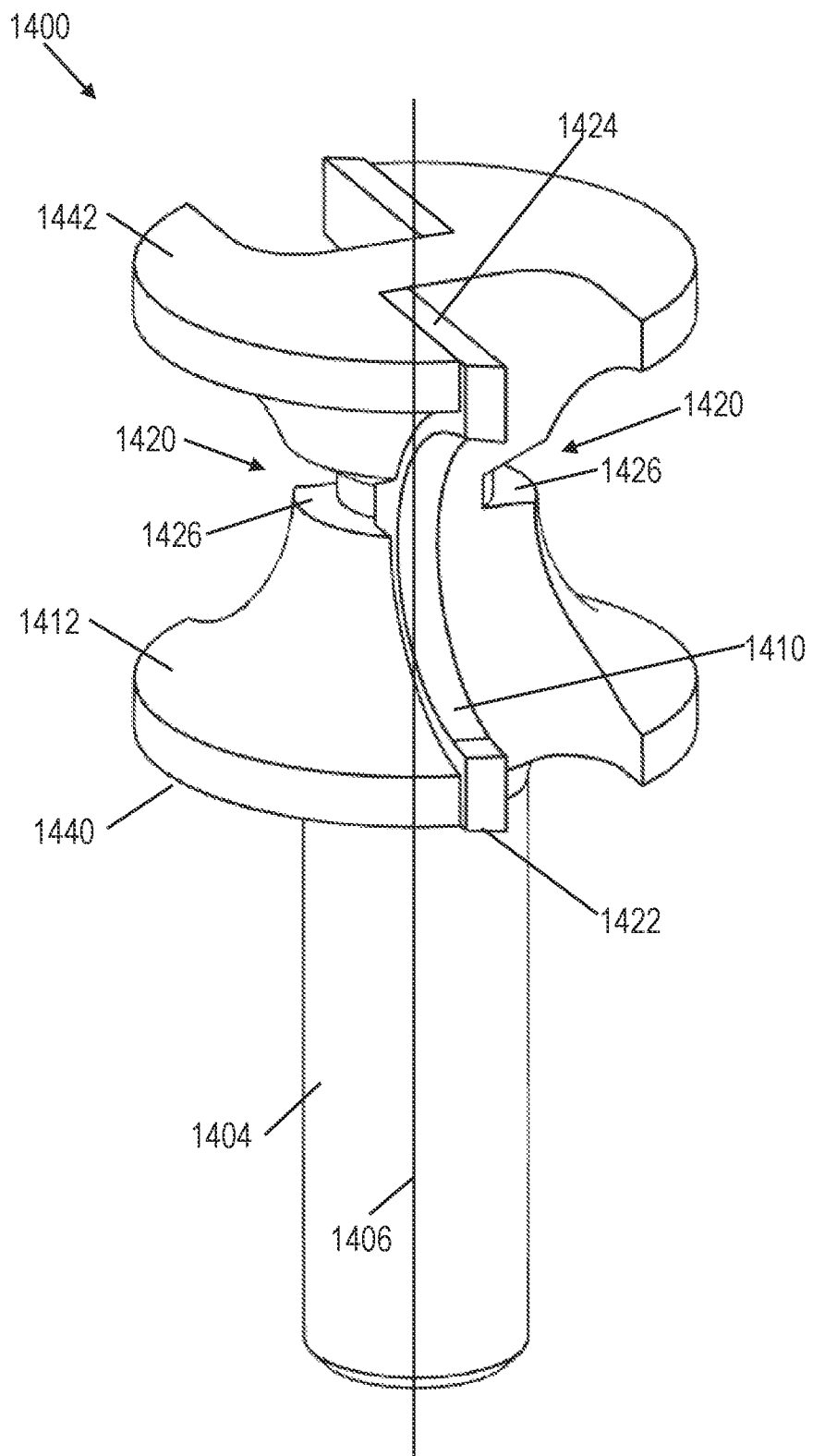
FIG. 14A is a perspective view of an example embodiment of a concave router bit with an example embodiment of an indexing feature.
Figure 14B:
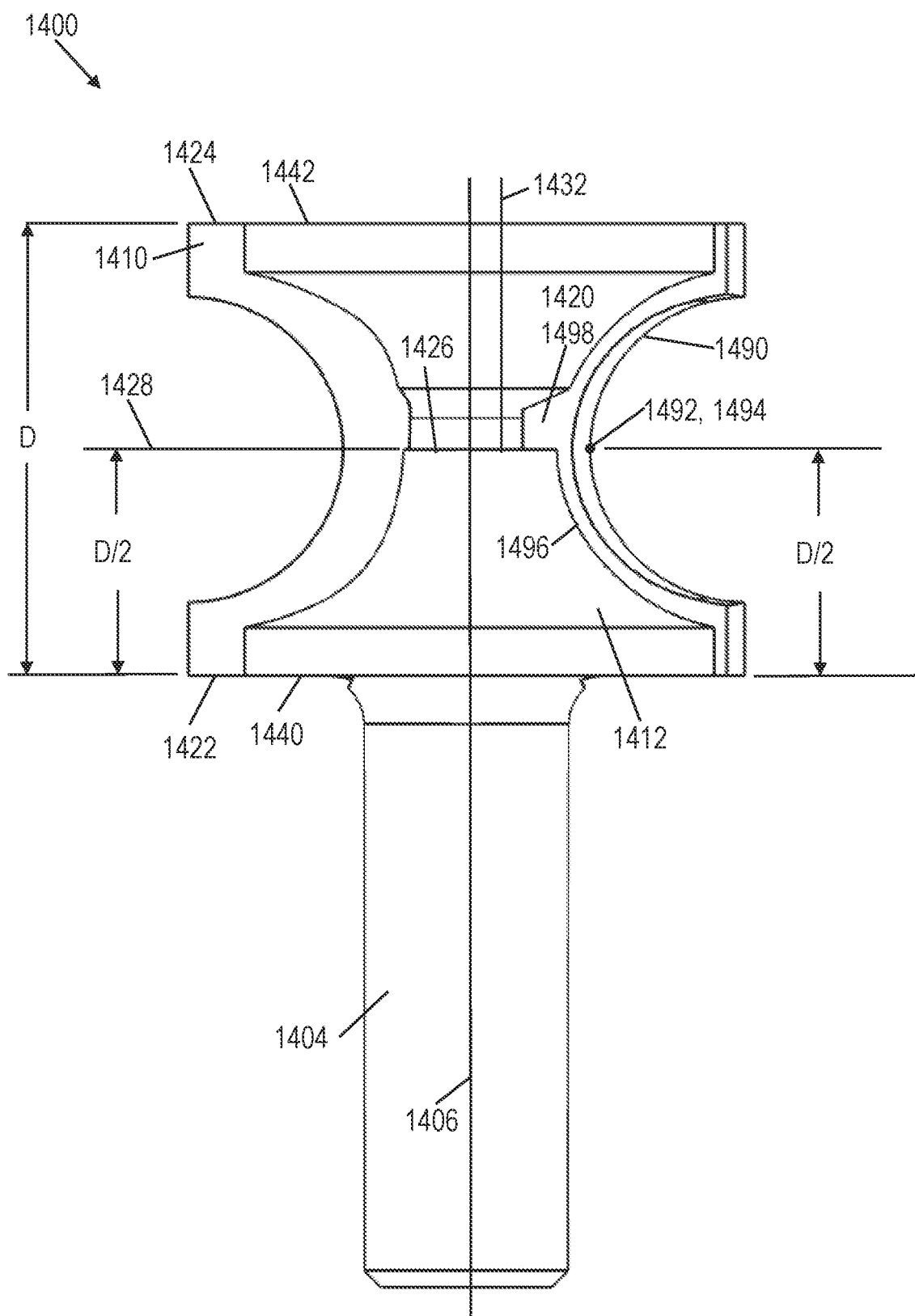
FIG. 14B and FIG. 14C are side views of the concave router bit of FIG. 14A.
Figure 14C:
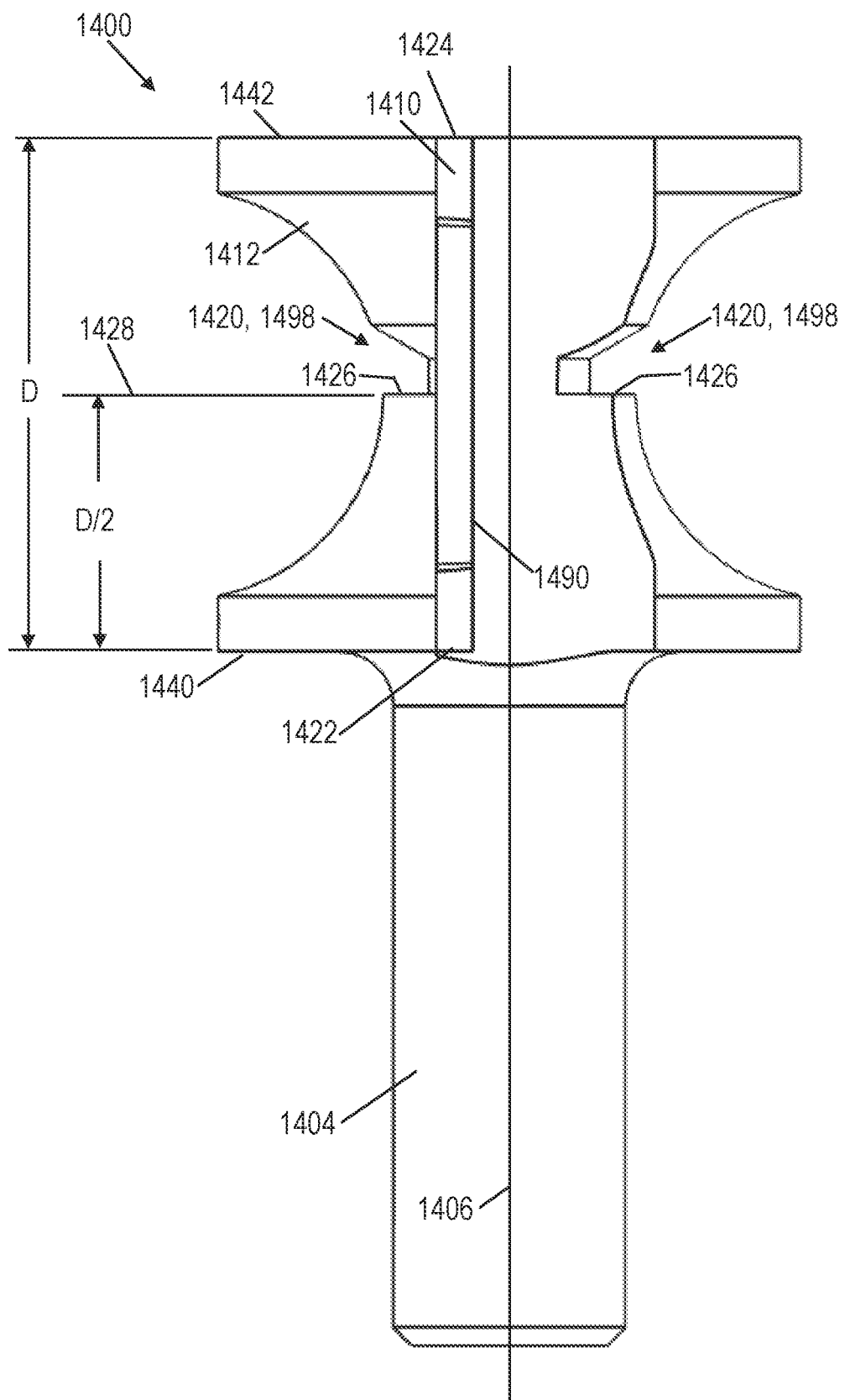
Figure 14D:
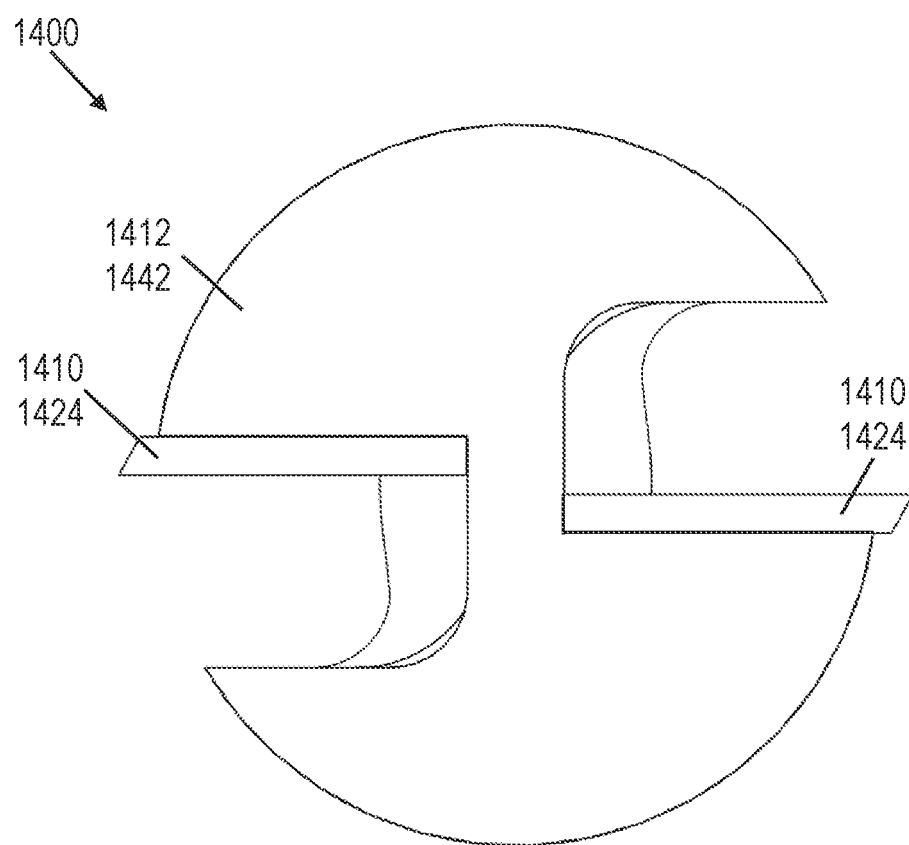
FIG. 14D is a top view of the concave router bit of FIG. 14A.

Along the longitudinal axis 1406 the cutter 1410 defines a concave cutting-edge profile 1490. In this example embodiment, the concave cutting-edge profile 1490 defines an arcuate shape that forms a semi-circle, although any concave shape is possible. The concave cutting-edge profile 1490 is symmetric about a midpoint 1492 of the concave cutting-edge profile 1490. As shown in FIG. 14B, symmetric about the midpoint 1492 means that the part of the concave cutting-edge profile 1490 above the midpoint 1492 is a mirror image of a part of the concave cutting-edge profile 1490 below the midpoint 1492. However, the concave cutting-edge profile 1490 need not be symmetric about the midpoint 1492.

The midpoint 1492 is a point that is equidistant along the longitudinal axis 1406 from the cutter proximal end 1422 and the cutter distal end 1424 (the longitudinal ends of the concave cutting-edge profile 1490). The midpoint 1492 also coincides with a turning point 1994 of the concave cutting-edge profile 1490, which is a point at which the profile turns along the horizontal axis as seen in FIG. 14B. The turning point 1494 of the concave cutting-edge profile 1490 is also a radially innermost point of the concave cutting-edge profile 1490 relative to the longitudinal axis 1406. In this example embodiment, the midpoint 1492, the turning point 1494, and the flat surface indexing feature 1426 all coexist at the midpoint 1428 (D/2, a.k.a. the exact center) between the cutter proximal end 1422 and the cutter distal end 1424.

The body 1412 likewise defines a concave body profile 1496. In this example embodiment, the concave body profile 1496 defines an arcuate shape that forms a semi-circle, although any shape is possible. The concave body profile 1496 is uninterrupted except for a lone subregion 1498 defined by the recess 1420. The flat surface indexing feature 1426 bisects the concave cutting-edge profile 1490 and the concave body profile 1496. Along the longitudinal axis 1406, a profile of the recess 1420 is asymmetric about the midpoint 1492. As shown in FIG. 14B, asymmetric about the midpoint 1492 means that the part of the profile of the recess 1420 above the midpoint 1492 is not a mirror image of a part of the profile of the recess 1420 below the midpoint 1492. In this example embodiment, the part that is not symmetric is limited to the subregion 1498.

FIG. 15A to FIG. 15D are various views of an alternate example embodiment of a concave router bit 1500 with an example embodiment of an indexing feature 1526. In this example embodiment, the concave router bit 1500 is a thumbnail bit.

The concave router bit 1500 includes a shank 1504 that defines a longitudinal axis 1506, multiple cutters 1510, a body 1512 that secures the cutters 1510 to the shank 1504, recesses 1520, a cutter proximal end 1522, a cutter distal end 1524, the indexing features 1526, a body proximal end 1540, and a body distal end 1542 that is opposite the body proximal end 1540.

The indexing feature 1526 is a flat surface that extends perpendicular to the longitudinal axis 1506 such that the normal line 1532 to the flat surface extends parallel to the longitudinal axis 1506. The flat surface indexing feature 1526 is located at a midpoint 1528 (D/2, a.k.a. the exact center) between the cutter proximal end 1522 and the cutter distal end 1524.

Figure 15A:
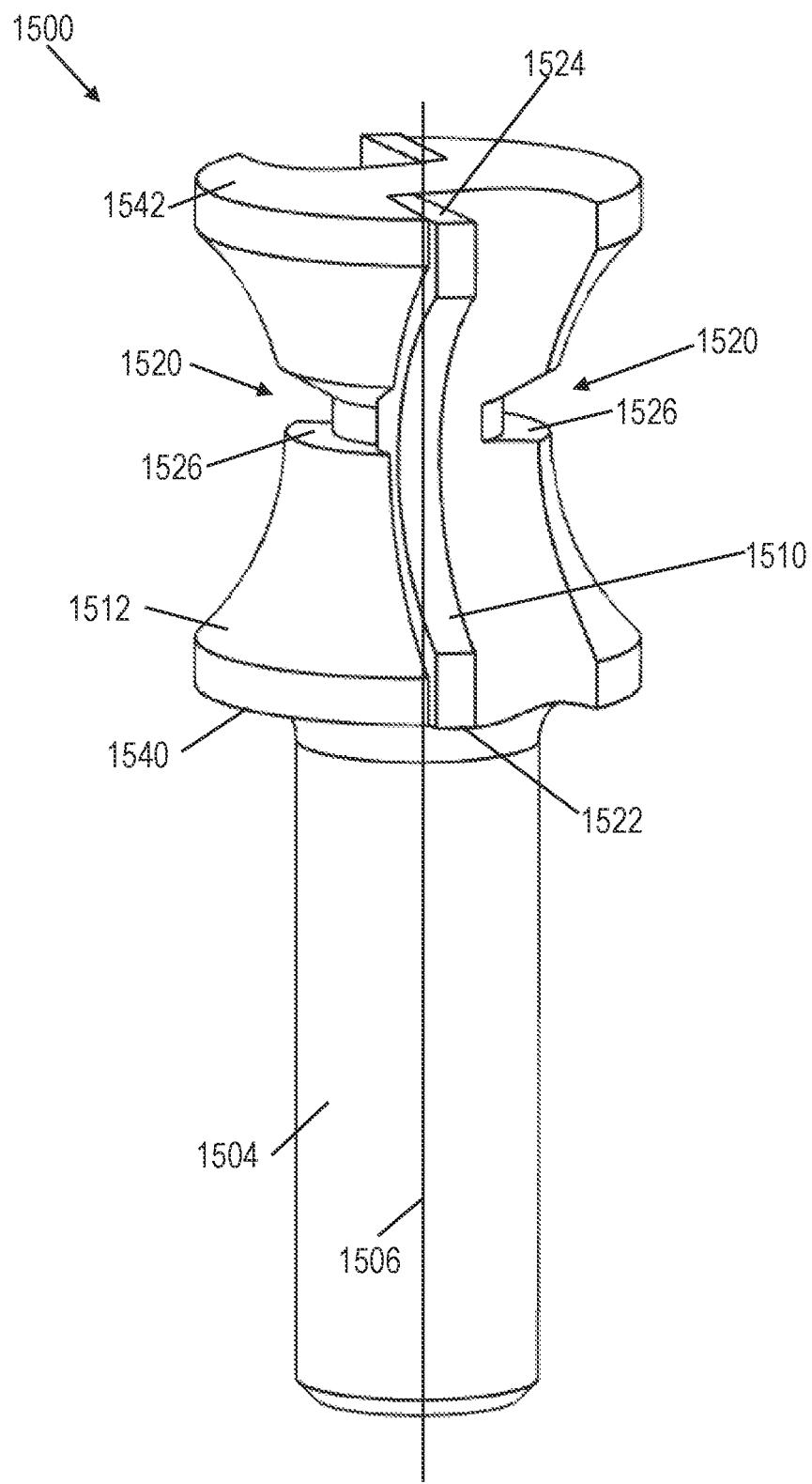
FIG. 15A is a perspective view of an alternate example embodiment of a concave router bit with an example embodiment of an indexing feature.
Figure 15B:
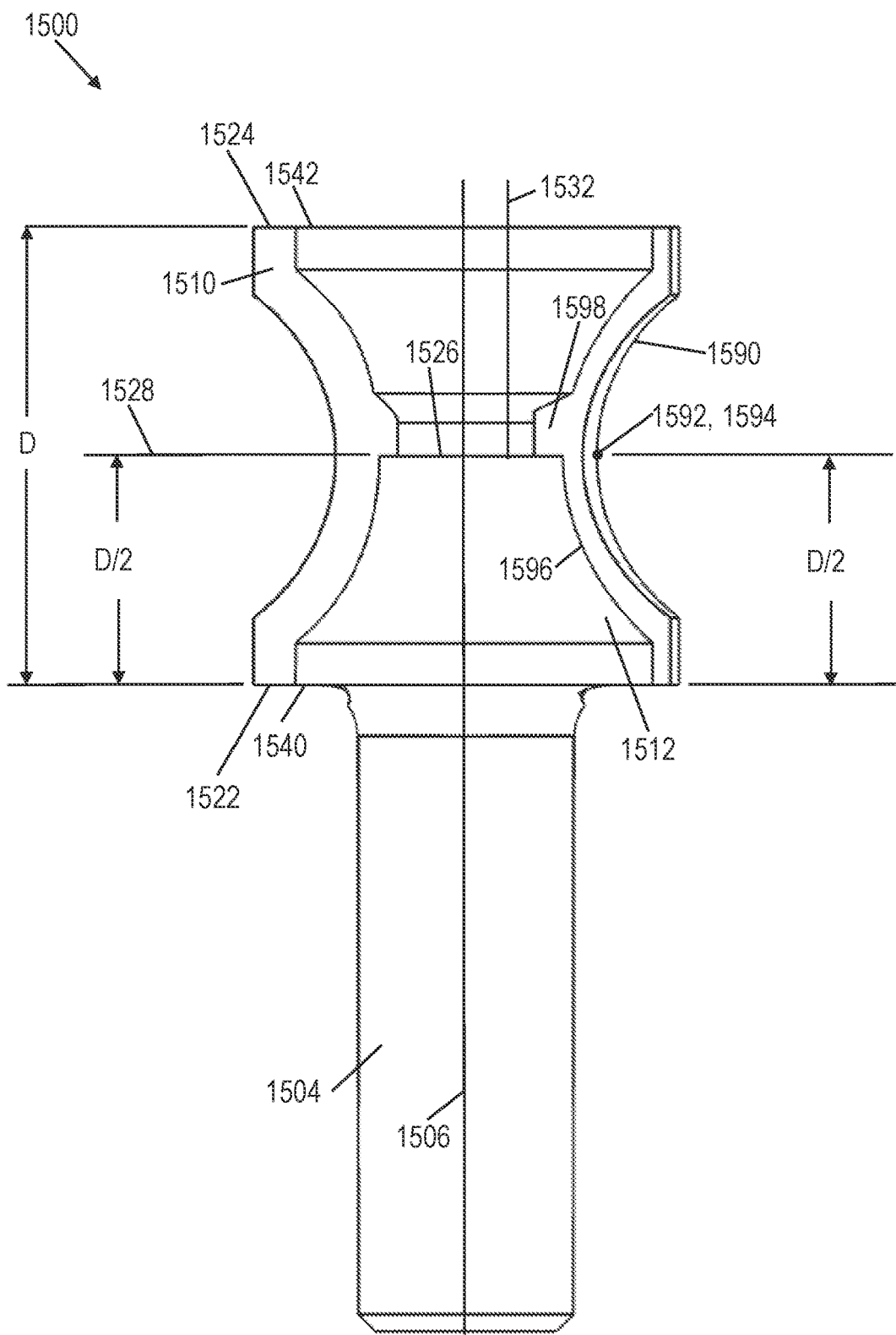
FIG. 15B and FIG. 15C are side views of the concave router bit of FIG. 15A.
Figure 15C:
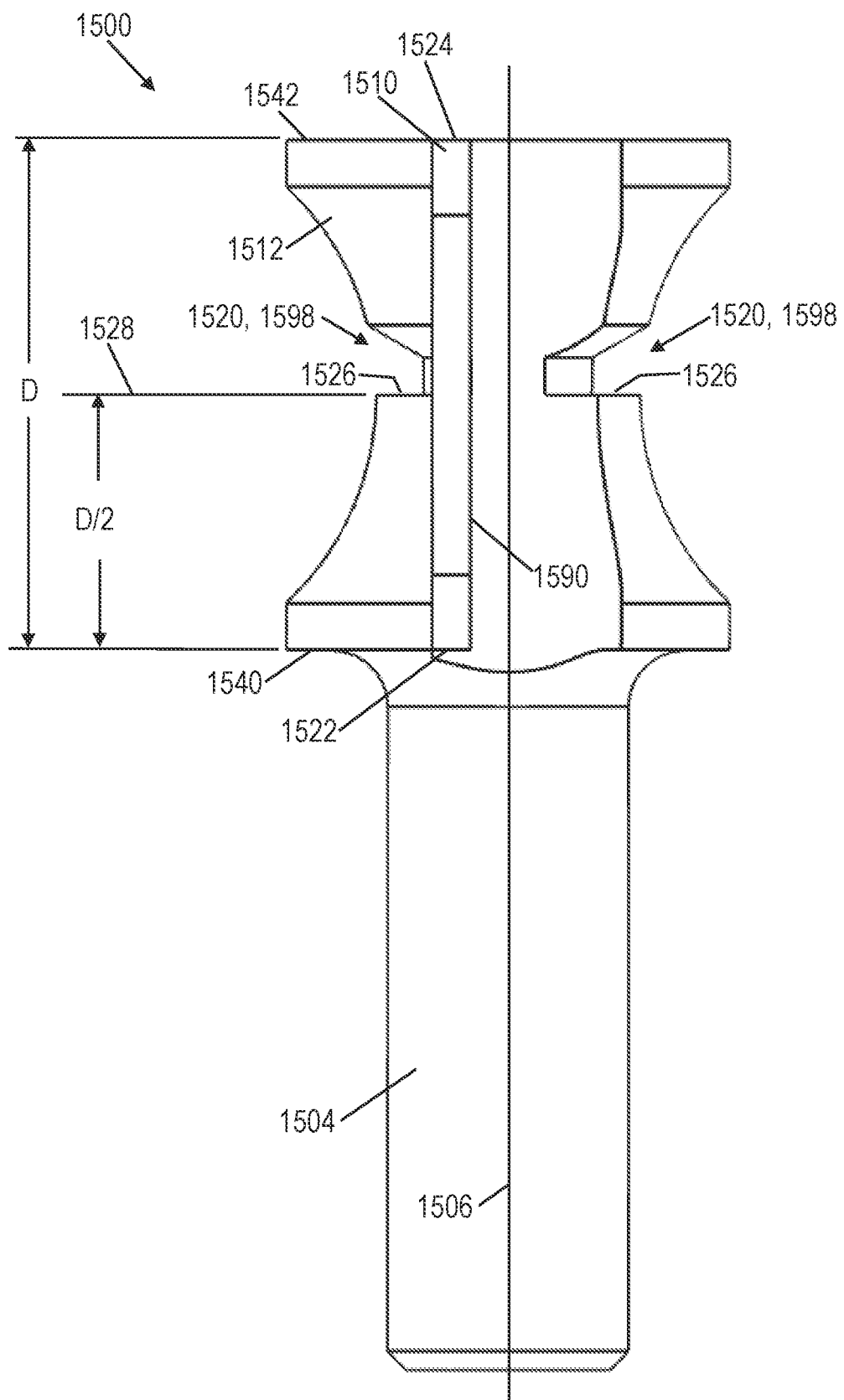
Figure 15D:
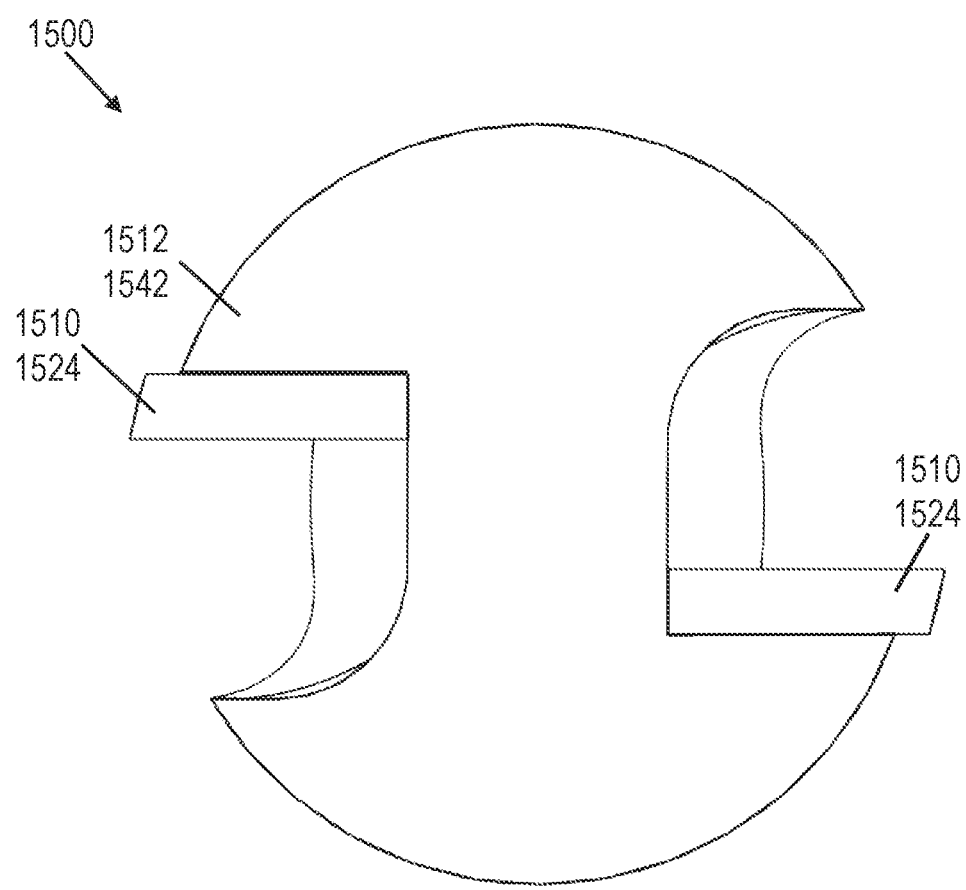
FIG. 15D is a top view of the concave router bit of FIG. 15A.

Along the longitudinal axis 1506 the cutter 1510 defines a concave cutting-edge profile 1590. In this example embodiment, the concave cutting-edge profile 1590 defines an arcuate shape that forms a minor circular arc, although any concave shape is possible. The concave cutting-edge profile 1590 is symmetric about a midpoint 1592 of the concave cutting-edge profile 1590. As shown in FIG. 15B, symmetric about the midpoint 1592 means that the part of the concave cutting-edge profile 1590 above the midpoint 1592 is a mirror image of a part of the concave cutting-edge profile 1590 below the midpoint 1592. However, the concave cutting-edge profile 1590 need not be symmetric about the midpoint 1592.

The midpoint 1592 is a point that is equidistant along the longitudinal axis 1506 from the cutter proximal end 1522 and from the cutter distal end 1524 (the longitudinal ends of the concave cutting-edge profile 1590). The midpoint 1592 also coincides with a turning point 1994 of the concave cutting-edge profile 1590, which is a point at which the profile turns along the horizontal axis as seen in FIG. 15B. The turning point 1594 of the concave cutting-edge profile 1590 is also a radially innermost point of the concave cutting-edge profile 1590 relative to the longitudinal axis 1506. In this example embodiment, the midpoint 1592, the turning point 1594, and the flat surface indexing feature 1526 all coexist at the midpoint 1528 (D/2, a.k.a. the exact center) between the cutter proximal end 1522 and the cutter distal end 1524.

The body 1512 likewise defines a concave body profile 1596. In this example embodiment, the concave body profile 1596 defines an arcuate shape that forms a semi-circle, although any shape is possible. The concave body profile 1596 is uninterrupted except for a lone subregion 1598 defined by the recess 1520. The flat surface indexing feature 1526 bisects the concave cutting-edge profile 1590 and the concave body profile 1596. Along the longitudinal axis 1506, a profile of the recess 1520 is asymmetric about the midpoint 1592. As shown in FIG. 15B, asymmetric about the midpoint 1592 means that the part of the profile of the recess 1520 above the midpoint 1592 is not a mirror image of a part of the profile of the recess 1520 below the midpoint 1592. In this example embodiment, the part that is not symmetric is limited to the subregion 1598.

Figure 16A:
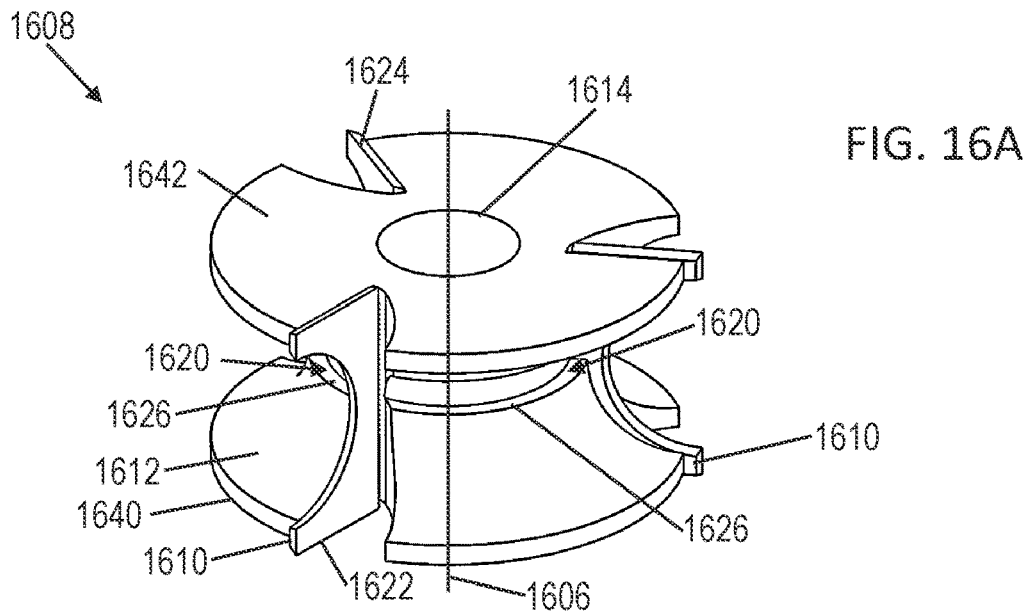
FIG. 16A is a perspective view of an example embodiment of a concave shaper head with an example embodiment of an indexing feature.
Figure 16B:
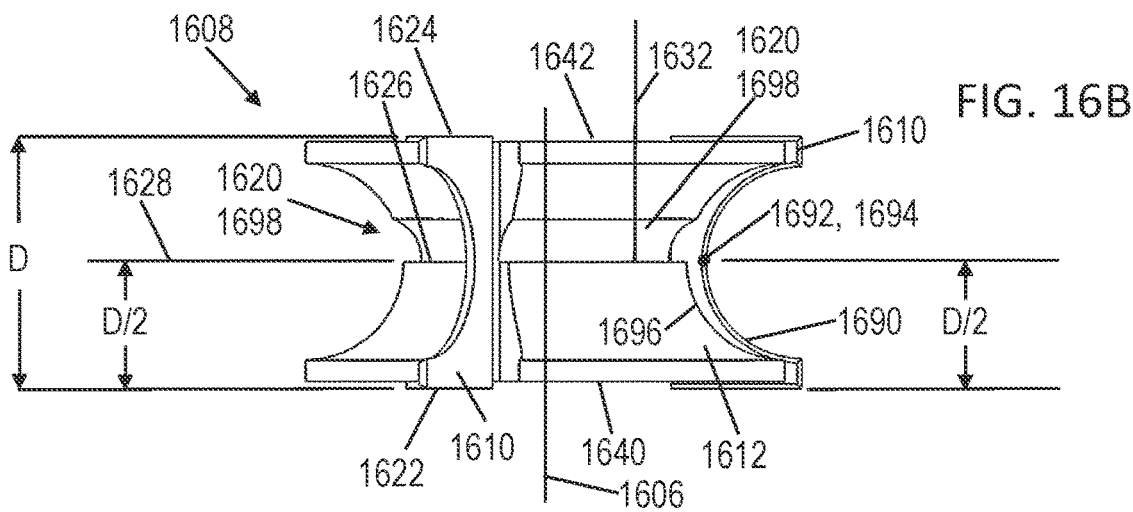
FIG. 16B is a side view of an example embodiment of the concave shaper head of FIG. 16A.
Figure 16C:
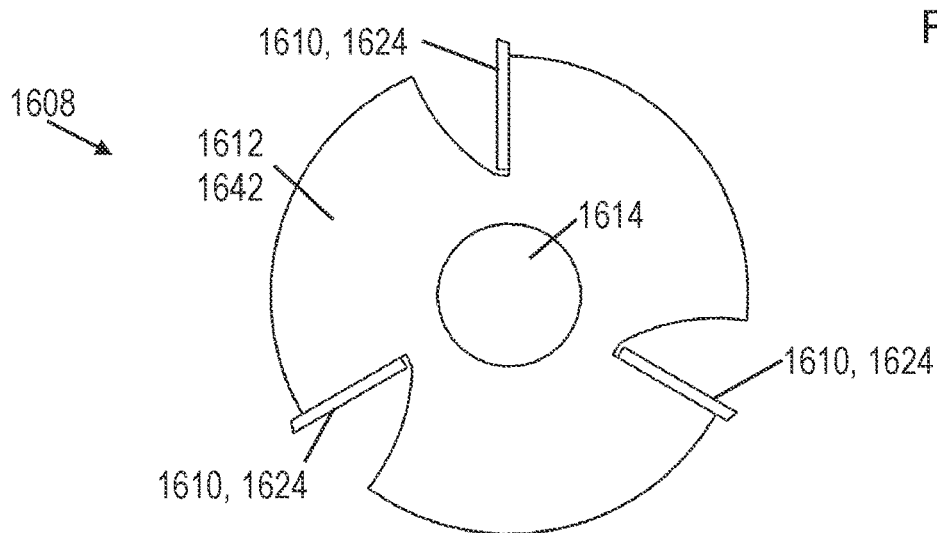
FIG. 16C is a top view of an example embodiment of the concave shaper head of FIG. 16A.

FIG. 16A to FIG. 16C are various views of an example embodiment of a concave shaper head 1608 with an example embodiment of an indexing feature 1626. In this example embodiment, the concave shaper head 1608 is a round over shaper head. The concave shaper head 1608 generates the same type of cut as the round over router bit of FIG. 14A and operates using the same principles, mutatis mutandis. However, any concave shape is possible. The concave shaper head 1608 is suitable for use with a shaper spindle 1304 like that shown in FIG. 13C to form a shaper head assembly.

The concave shaper head 1608 defines a longitudinal axis 1606 that when assembled to the shaper spindle 1304 is the same as the longitudinal axis 1306 of the shaper spindle 1304. The concave shaper head 1608 includes multiple cutters 1610, a body 1612, a bore 1614 to secure the cutters 1610 to the shaper spindle 1304, multiple recesses 1620, a cutter proximal end 1622, a cutter distal end 1624, the indexing features 1626, a body proximal end 1640, and a body distal end 1642 that is opposite the body proximal end 1640. While multiple cutters 1610 are shown, there only needs to be one cutter 1610. Likewise, while multiple recesses 1620 are shown, there only needs to be one recesses 1620. If multiple cutters are used, where each cutter occupies a different space along the longitudinal axis, then the cutter proximal axial end is the proximal end of the most proximal cutter and the cutter distal end is the distal end of the most distal cutter.

The indexing feature 1626 is a flat surface that extends perpendicular to the longitudinal axis 1606 such that the normal line 1632 to the flat surface extends parallel to the longitudinal axis 1606. The flat surface indexing feature 1626 is located at a midpoint 1628 (D/2, a.k.a. the exact center) between the cutter proximal end 1622 and the cutter distal end 1624.

Along the longitudinal axis 1606 the cutter 1610 defines a concave cutting-edge profile 1690. In this example embodiment, the concave cutting-edge profile 1690 defines an arcuate shape that forms a semicircle, although any concave shape is possible. The concave cutting-edge profile 1690 is symmetric about a midpoint 1692 of the concave cutting-edge profile 1690. As shown in FIG. 16B, symmetric about the midpoint 1692 means that the part of the concave cutting-edge profile 1690 above the midpoint 1692 is a mirror image of a part of the concave cutting-edge profile 1690 below the midpoint 1692. However, the concave cutting-edge profile 1690 need not be symmetric about the midpoint 1692.

The midpoint 1692 is a point that is equidistant along the longitudinal axis 1606 from the cutter proximal end 1622 and from the cutter distal end 1624 (the longitudinal ends of the concave cutting-edge profile 1690). The midpoint 1692 also coincides with a turning point 1994 of the concave cutting-edge profile 1690, which is a point at which the profile turns along the horizontal axis as seen in FIG. 16B. The turning point 1694 of the concave cutting-edge profile 1690 is also a radially innermost point of the concave cutting-edge profile 1690 relative to the longitudinal axis 1606. In this example embodiment, the midpoint 1692, the turning point 1694, and the flat surface indexing feature 1626 all coexist at the midpoint 1628 (D/2, a.k.a. the exact center) between the cutter proximal end 1622 and the cutter distal end 1624.

The body 1612 likewise defines a concave body profile 1696. In this example embodiment, the concave body profile 1696 defines an arcuate shape that forms a semi-circle, although any shape is possible. The concave body profile 1696 is uninterrupted except for a lone subregion 1698 defined by the recess 1620. The flat surface indexing feature 1626 bisects the concave cutting-edge profile 1690 and the concave body profile 1696. Along the longitudinal axis 1606, a profile of the recess 1620 is asymmetric about the midpoint 1692. As shown in FIG. 16B, asymmetric about the midpoint 1692 means that the part of the profile of the recess 1620 above the midpoint 1692 is not a mirror image of a part of the profile of the recess 1620 below the midpoint 1692. In this example embodiment, the part that is not symmetric is limited to the subregion 1698.

FIG. 17A to FIG. 17D are various views of an example embodiment of a convex router bit 1700 with an example embodiment of an indexing feature 1726.

The convex router bit 1700 includes a shank 1704 that defines a longitudinal axis 1706, multiple cutters 1710, a body 1712 that secures the cutters 1710 to the shank 1704, recesses 1720, a cutter proximal end 1722, a cutter distal end 1724, the indexing features 1726, a body proximal end 1740, and a body distal end 1742 that is opposite the body proximal end 1740. In this example embodiment, the shank 1704 includes a bolt 1704A, a washer 1704B, and a bearing 1704C that releasable secure the body 1712 to the shank 1704.

The indexing feature 1726 is a flat surface that extends perpendicular to the longitudinal axis 1706 such that the normal line 1732 to the flat surface extends parallel to the longitudinal axis 1706. The flat surface indexing feature 1726 is located at a midpoint 1728 (D/2, a.k.a. the exact center) between the cutter proximal end 1722 and the cutter distal end 1724.

Figure 17A:
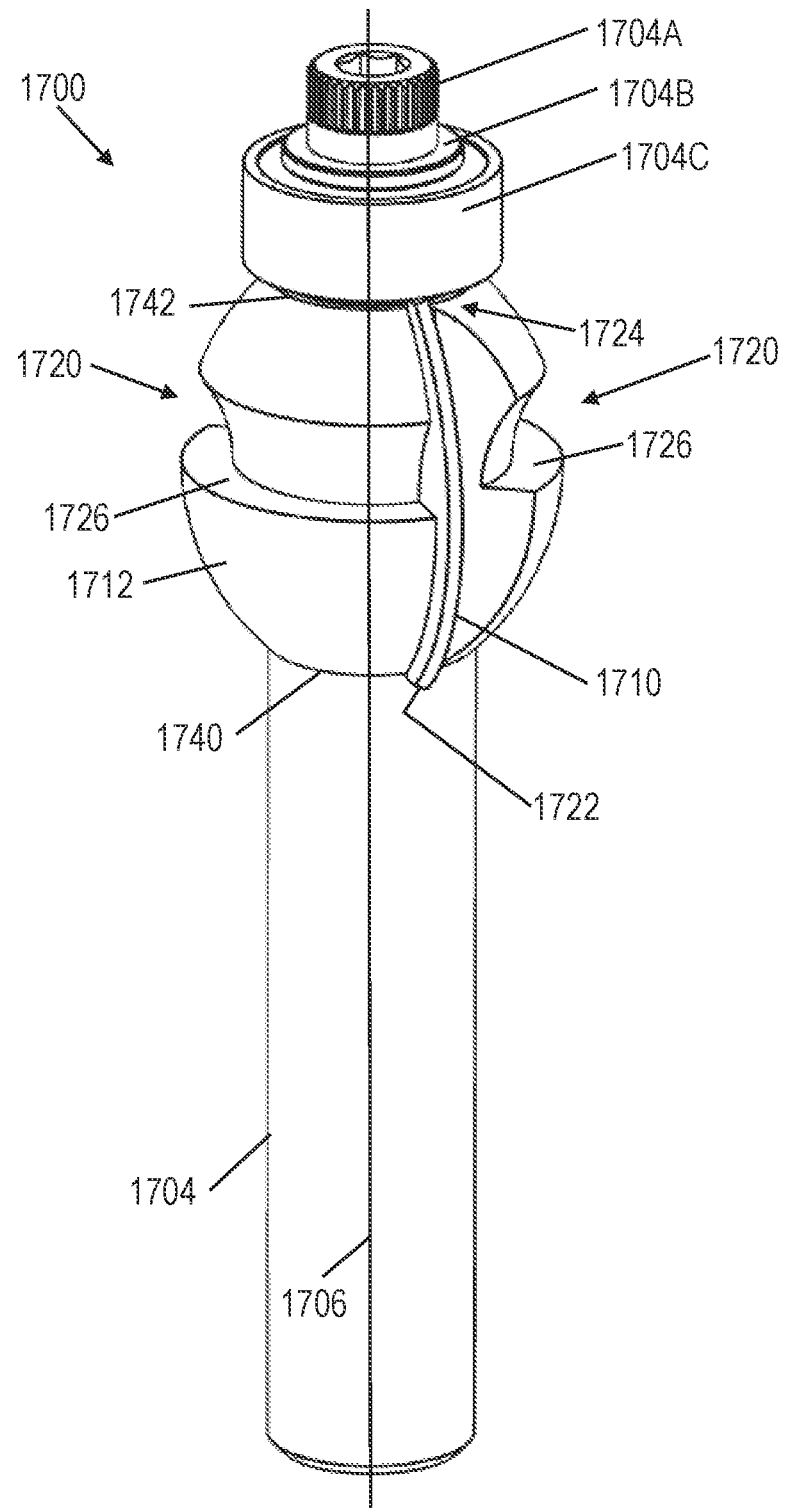
FIG. 17A is a perspective view of an example embodiment of a convex router bit with an example embodiment of an indexing feature.
Figure 17B:
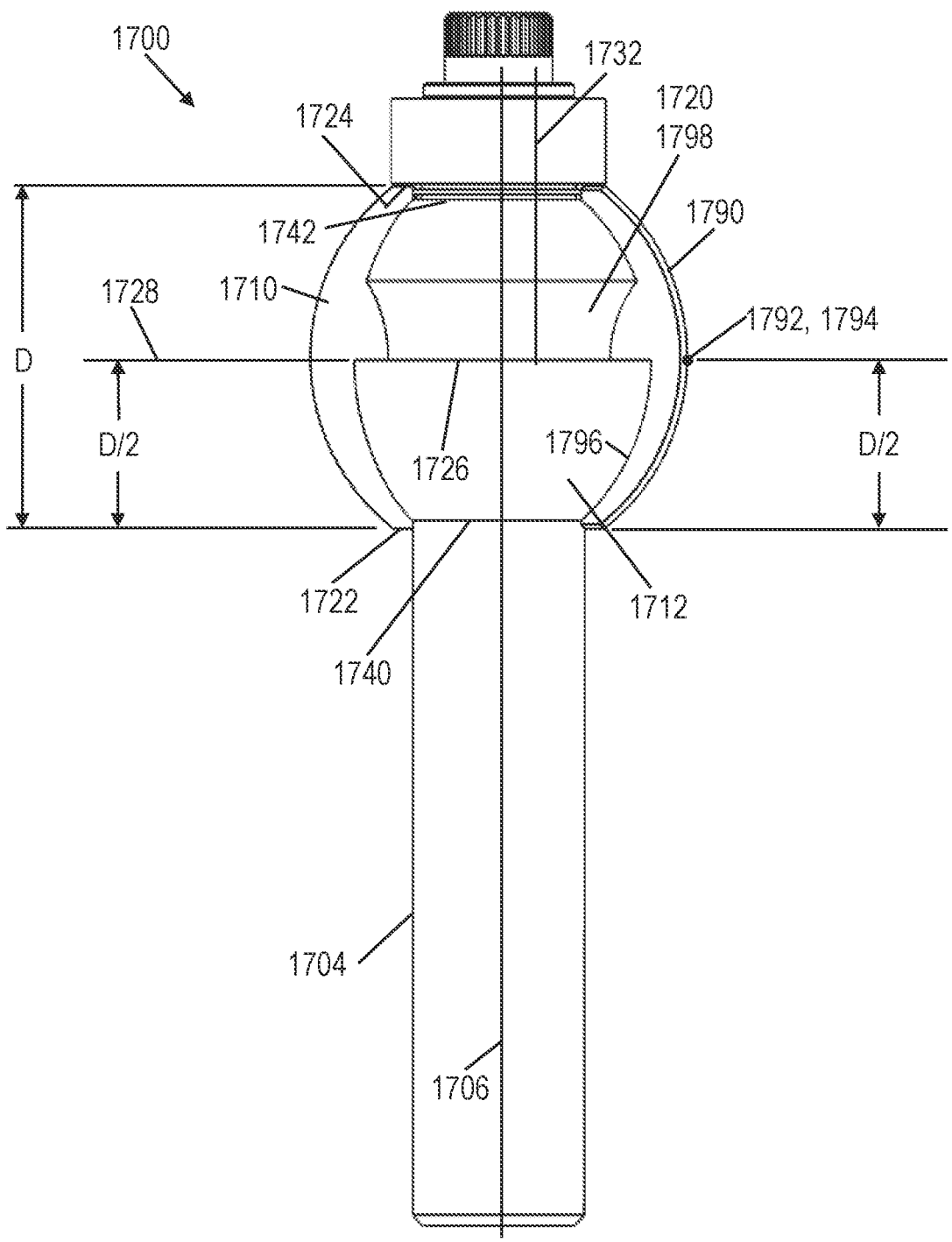
FIG. 17B and FIG. 17C are side views of the convex router bit of FIG. 17A.
Figure 17C:
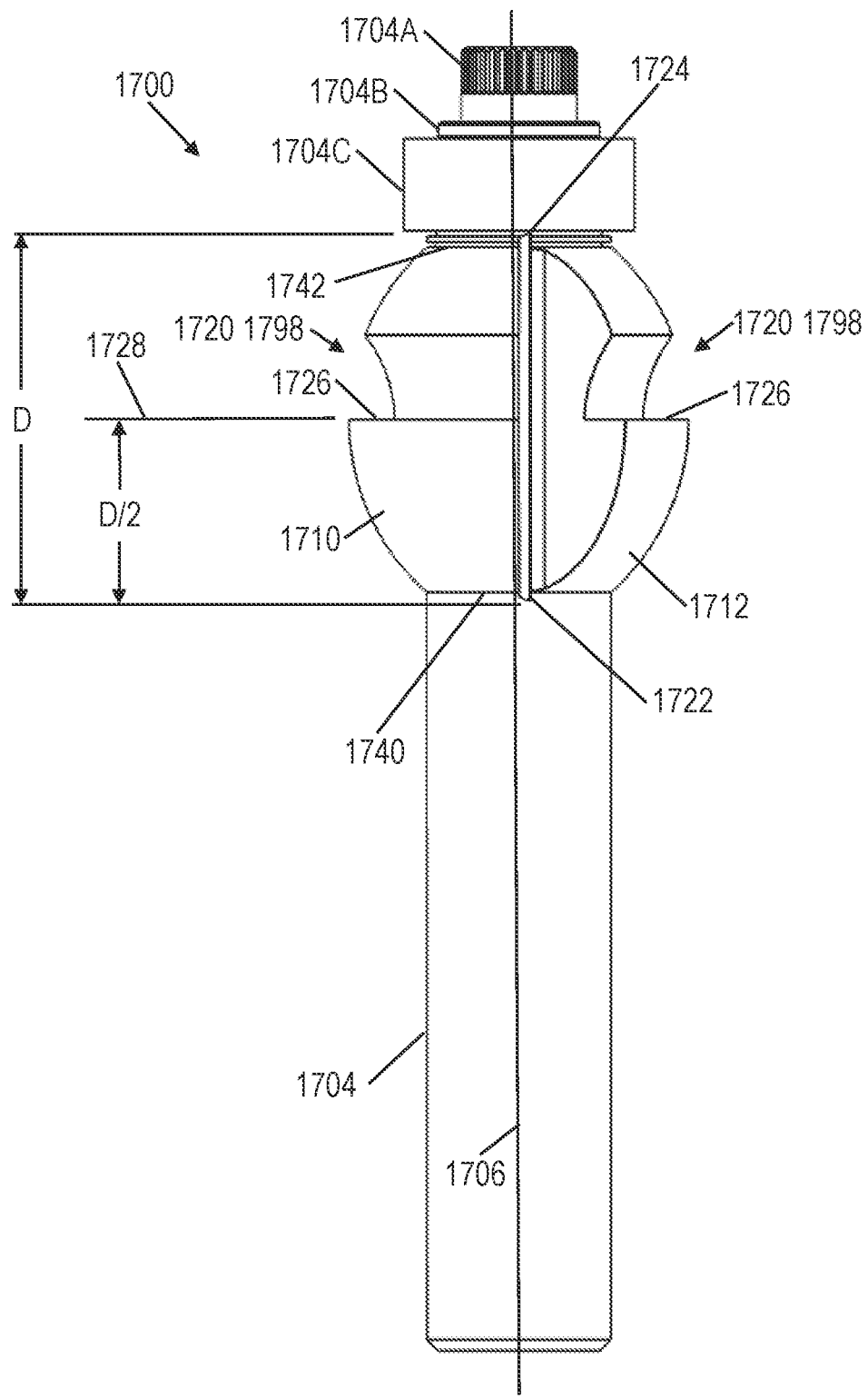
Figure 17D:
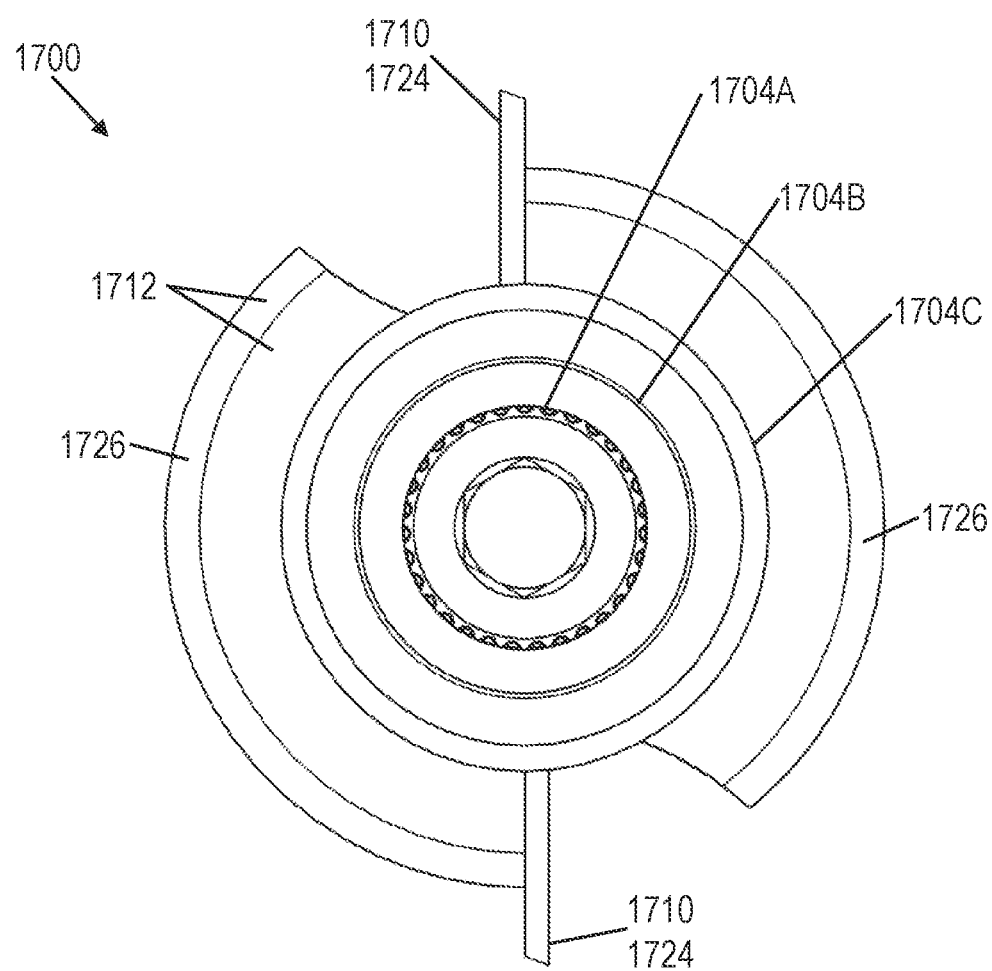
FIG. 17D is a top view of the convex router bit of FIG. 17A.

Along the longitudinal axis 1706 the cutter 1710 defines a convex cutting-edge profile 1790. In this example embodiment, the convex cutting-edge profile 1790 defines an arcuate shape that forms a minor circular arc, although any convex shape is possible. The convex cutting-edge profile 1790 is symmetric about a midpoint 1792 of the convex cutting-edge profile 1790. As shown in FIG. 17B, symmetric about the midpoint 1792 means that the part of the convex cutting-edge profile 1790 above the midpoint 1792 is a mirror image of a part of the convex cutting-edge profile 1790 below the midpoint 1792. However, the convex cutting-edge profile 1790 need not be symmetric about the midpoint 1792.

The midpoint 1792 is a point that is equidistant along the longitudinal axis 1706 from the cutter proximal end 1722 and from the cutter distal end 1724 (the longitudinal ends of the convex cutting-edge profile 1790). The midpoint 1792 also coincides with a turning point 1994 of the convex cutting-edge profile 1790, which is a point at which the profile turns along the horizontal axis as seen in FIG. 17B. The turning point 1794 of the convex cutting-edge profile 1790 is also a radially outermost point of the convex cutting-edge profile 1790 relative to the longitudinal axis 1706. In this example embodiment, the midpoint 1792, the turning point 1794, and the flat surface indexing feature 1726 all coexist at the midpoint 1728 (D/2, a.k.a. the exact center) between the cutter proximal end 1722 and the cutter distal end 1724.

The body 1712 likewise defines a convex body profile 1796. In this example embodiment, the convex body profile 1796 defines an arcuate shape that forms a minor circular arc, although any shape is possible. The convex body profile 1796 is uninterrupted except for a lone subregion 1798 defined by the recess 1720. The flat surface indexing feature 1726 bisects the convex cutting-edge profile 1790 and the convex body profile 1796. Along the longitudinal axis 1706, a profile of the recess 1720 is asymmetric about the midpoint 1792. As shown in FIG. 17B, asymmetric about the midpoint 1792 means that the part of the profile of the recess 1720 above the midpoint 1792 is not a mirror image of a part of the profile of the recess 1720 below the midpoint 1792. In this example embodiment, the part that is not symmetric is limited to the subregion 1798.

Figure 18A:
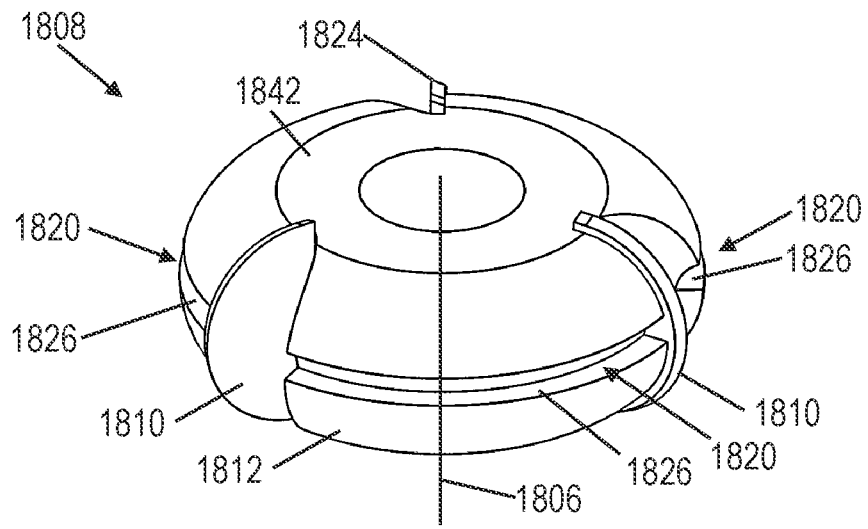
FIG. 18A is a perspective view of an example embodiment of a convex shaper head with an example embodiment of an indexing feature.
Figure 18B:
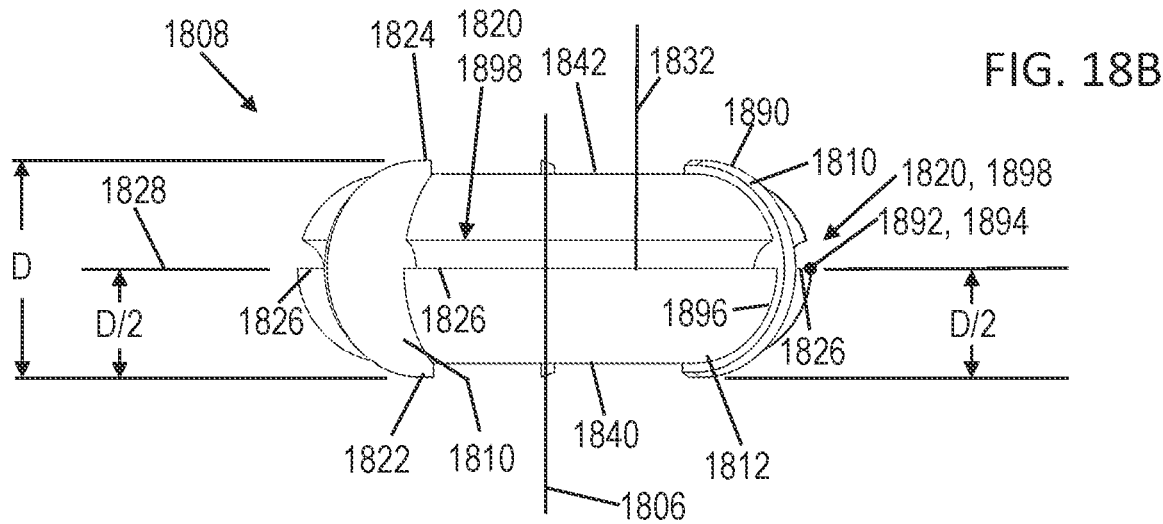
FIG. 18B is a side view of an example embodiment of the convex shaper head of FIG. 18A.
Figure 18C:
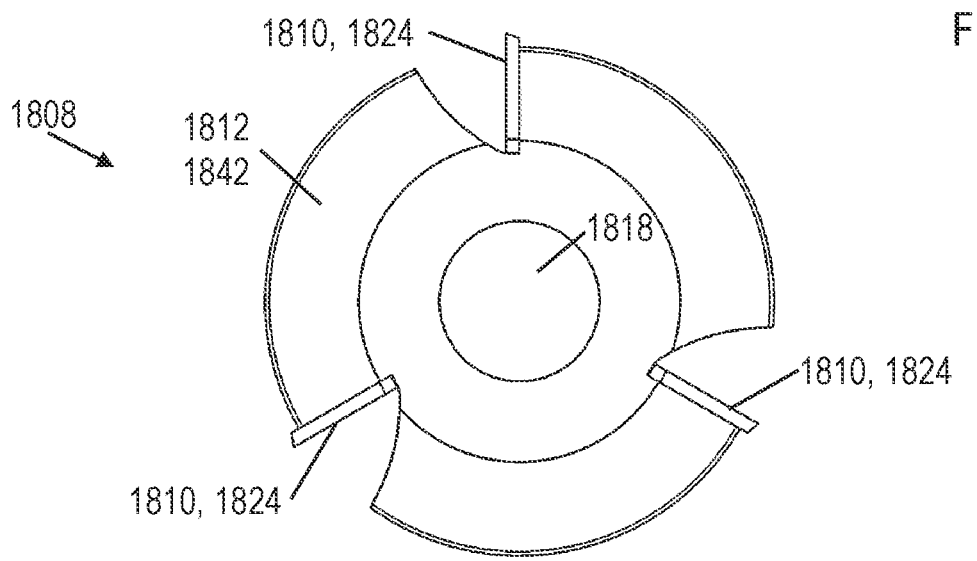
FIG. 18C is a top view of an example embodiment of the convex shaper head of FIG. 18A.

FIG. 18A to FIG. 18C are various views of an example embodiment of a convex shaper head 1808 with an example embodiment of an indexing feature 1826. The convex shaper head 1808 operates using the same principles as the concave shaper head 1608 of FIG. 16A, mutatis mutandis. The convex shaper head 1808 is suitable for use with a shaper spindle 1304 like that shown in FIG. 13C to form a shaper head assembly.

The convex shaper head 1808 defines a longitudinal axis 1806 that when assembled to the shaper spindle 1304 is the same as the longitudinal axis 1306 of the shaper spindle 1304. The convex shaper head 1808 includes multiple cutters 1810, a body 1812, a bore 1814 to secure the cutters 1810 to the shaper spindle 1304, multiple recesses 1820, a cutter proximal end 1822, a cutter distal end 1824, the indexing features 1826, a body proximal end 1840, and a body distal end 1842 that is opposite the body proximal end 1840. While multiple cutters 1810 are shown, there only needs to be one cutter 1810. Likewise, while multiple recesses 1820 are shown, there only needs to be one recesses 1820. If multiple cutters are used, where each cutter occupies a different space along the longitudinal axis, then the cutter proximal axial end is the proximal end of the most proximal cutter and the cutter distal end is the distal end of the most distal cutter.

The indexing feature 1826 is a flat surface that extends perpendicular to the longitudinal axis 1806 such that the normal line 1832 to the flat surface extends parallel to the longitudinal axis 1806. The flat surface indexing feature 1826 is located at a midpoint 1828 (D/2, a.k.a. the exact center) between the cutter proximal end 1822 and the cutter distal end 1824.

Along the longitudinal axis 1806 the cutter 1810 defines a convex cutting-edge profile 1890. In this example embodiment, the convex cutting-edge profile 1890 defines an arcuate shape that forms a semicircle, although any convex shape is possible. The convex cutting-edge profile 1890 is symmetric about a midpoint 1892 of the convex cutting-edge profile 1890. As shown in FIG. 18B, symmetric about the midpoint 1892 means that the part of the convex cutting-edge profile 1890 above the midpoint 1892 is a mirror image of a part of the convex cutting-edge profile 1890 below the midpoint 1892. However, the convex cutting-edge profile 1890 need not be symmetric about the midpoint 1892.

The midpoint 1892 is a point that is equidistant along the longitudinal axis 1806 from the cutter proximal end 1822 and from the cutter distal end 1824 (the longitudinal ends of the convex cutting-edge profile 1890). The midpoint 1892 also coincides with a turning point 1994 of the convex cutting-edge profile 1890, which is a point at which the profile turns along the horizontal axis as seen in FIG. 18B. The turning point 1894 of the convex cutting-edge profile 1890 is also a radially outermost point of the convex cutting-edge profile 1890 relative to the longitudinal axis 1806. In this example embodiment, the midpoint 1892, the turning point 1894, and the flat surface indexing feature 1826 all coexist at the midpoint 1828 (D/2, a.k.a. the exact center) between the cutter proximal end 1822 and the cutter distal end 1824.

The body 1812 likewise defines a convex body profile 1896. In this example embodiment, the convex body profile 1896 defines an arcuate shape that forms a semi-circle, although any shape is possible. The convex body profile 1896 is uninterrupted except for a lone subregion 1898 defined by the recess 1820. The flat surface indexing feature 1826 bisects the convex cutting-edge profile 1890 and the convex body profile 1896. Along the longitudinal axis 1806, a profile of the recess 1820 is asymmetric about the midpoint 1892. As shown in FIG. 18B, asymmetric about the midpoint 1892 means that the part of the profile of the recess 1820 above the midpoint 1892 is not a mirror image of a part of the profile of the recess 1820 below the midpoint 1892. In this example embodiment, the part that is not symmetric is limited to the subregion 1898.

As has been disclosed above, the router bits and indexing features disclosed herein provide a quick, simple, and effective way of accurately aligning cutters of router bits with edges of workpieces in a way not previously possible. Consequently, this represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
a shaper cutter head comprising: a body; a bored through the body; and a cutter secured to the body; wherein the body is configured to be releasably secured to a shaper spindle via the bore and when so assembled the body and the cutter extend along a longitudinal axis defined by the shaper spindle;
wherein along the longitudinal axis, the cutter comprises: a miter profile, a groove profile and a tongue profile for cutting a miter;
wherein the body comprises a portion comprising at least one recess, disposed at an axial position between the miter profile of the cutter and an end of the body; the at least one recess defining a flat indexing surface protruding radially outwards from a portion of the body, in relation to the longitudinal axis; and
wherein when the shaper cutter head is rotated about the longitudinal axis, the body defines a body sweep, such that in a side view of the shaper cutter head, the at least one recess is recessed from the body sweep and in an end view of the shaper cutter head, the flat indexing surface of the recess protrudes radially outward in relation to at least a portion of the body.

2. The apparatus of claim 1, wherein the flat indexing surface is oriented perpendicular to the longitudinal axis.

3. The apparatus of claim 2, a normal of the flat indexing surface is parallel to the longitudinal axis.

4. The apparatus of claim 1, wherein the flat indexing surface is located at a point that is equidistant from axial ends of the cutter.

5. An apparatus, comprising:
a shaper cutter head comprising: a body; a bore through the body; and a cutter secured to the body; wherein the body is configured to be releasably secured to a shaper spindle via the bore and when so assembled the body and the cutter extend along a longitudinal axis that is defined by the shaper spindle and that defines an axial direction extending from a distal end of the body to a proximal end of the body;
wherein the body comprises a substantially fructo-conical first portion at a position closer to the distal end, a central portion and a second portion at a position closer to the proximal end;
wherein the cutter comprises: a miter profile disposed on at least the first portion, a groove profile and a tongue profile for cutting a miter; and
wherein the central portion of the body defines at least one recess, disposed at an axial position between the first portion and the proximal end; and the at least one recess defining a flat indexing surface extending radially outwards in relation to the longitudinal axis such that in an end view of the shaper cutter head, the flat indexing surface of the recess protrudes radially outward in relation to the first portion.

6. The apparatus of claim 5, wherein the flat indexing surface is oriented perpendicular to the longitudinal axis.

7. The apparatus of claim 6, a normal of the flat indexing surface is parallel to the longitudinal axis.

8. The apparatus of claim 5, wherein the flat indexing surface is located at a point that is equidistant from axial ends of the cutter.

9. An apparatus, comprising:
a shaper cutter head comprising: a body; a bore through the body; and a cutter secured to the body; wherein the body is configured to be releasably secured to a shaper spindle via the bore and when so assembled the body and the cutter extend along a longitudinal axis that is defined by the shaper spindle and that defines an axial direction extending from a distal end of the body to a proximal end of the body; and wherein the cutter comprises a tip portion located closest to the distal end;
wherein in a direction from the distal end to the proximal end, when the shaper cutter head is rotated about the longitudinal axis, the body defines a first body sweep at a first body portion, wherein the first body sweep is disposed at a first radial distance from the longitudinal axis; and a second body sweep at a second body portion, wherein the second body sweep is disposed at a second radial distance from the longitudinal axis, larger than the first radial distance; and
wherein the body comprises a recess comprising a flat indexing surface extending radially outwards in relation to the longitudinal axis at a third radial distance, such that in an end view of the shaper cutter head, the third radial distance is larger than the first radial distance and smaller than the second radial distance.

10. The apparatus of claim 9, wherein the flat indexing surface is oriented perpendicular to the longitudinal axis.

11. The apparatus of claim 10, a normal of the flat indexing surface is parallel to the longitudinal axis.

12. The apparatus of claim 9, wherein the flat indexing surface is located at a point that is equidistant from axial ends of the cutter.

13. The apparatus of claim 1, further comprising the shaper spindle.

14. The apparatus of claim 5, further comprising the shaper spindle.

15. The apparatus of claim 9, further comprising the shaper spindle.

\* \* \* \* \*